(12) United States Patent
Noh et al.

(10) Patent No.: US 11,726,677 B2
(45) Date of Patent: Aug. 15, 2023

(54) STORAGE DEVICE CONFIGURED TO CHANGE POWER STATE BASED ON REFERENCE CLOCK FROM HOST DEVICE AND METHOD FOR OPERATING THE SAME

(71) Applicant: Samsung Electronics Co., Ltd., Suwon-si (KR)

(72) Inventors: Kwanwoo Noh, Seoul (KR); Sungho Seo, Seoul (KR); Yongwoo Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 4 days.

(21) Appl. No.: 17/142,627

(22) Filed: Jan. 6, 2021

(65) Prior Publication Data

US 2021/0216223 A1 Jul. 15, 2021

(30) Foreign Application Priority Data

Jan. 10, 2020 (KR) .................... 10-2020-0003793

(51) Int. Cl.
- *G06F 3/06* (2006.01)
- *G06F 9/44* (2018.01)
- *G06F 9/4401* (2018.01)
- *G06F 1/04* (2006.01)

(52) U.S. Cl.
CPC .............. *G06F 3/0625* (2013.01); *G06F 1/04* (2013.01); *G06F 3/0653* (2013.01); *G06F 3/0659* (2013.01); *G06F 3/0679* (2013.01); *G06F 9/4418* (2013.01)

(58) Field of Classification Search
CPC ..... G06F 3/0625; G06F 3/0653; G06F 9/4418
See application file for complete search history.

(56) References Cited

U.S. PATENT DOCUMENTS

| | | | |
|---|---|---|---|
| 6,292,412 B1 | 9/2001 | Kato et al. |
| 6,307,412 B1 | 10/2001 | Kim et al. |
| 8,036,333 B2 | 10/2011 | Jeon |
| 8,621,128 B2 | 12/2013 | Radulescu et al. |
| 8,819,462 B2 | 8/2014 | Cheong |

(Continued)

FOREIGN PATENT DOCUMENTS

| | | | |
|---|---|---|---|
| KR | 100286099 B1 | 4/2001 |
| KR | 100839488 B1 | 6/2008 |
| KR | 100354468 B1 | 9/2020 |

*Primary Examiner* — David E Martinez
(74) *Attorney, Agent, or Firm* — Harness, Dickey & Pierce, P.L.C.

(57) ABSTRACT

Disclosed is a storage device which includes an interface circuit that exchanges data with a host device, and a power management unit that supplies a power to the interface circuit. The interface circuit includes a first input terminal receiving a first signal from the host device, a second input terminal receiving a second signal complementary to the first signal from the host device, a receive module processing the first signal and the second signal, a squelch circuit detecting levels of the first signal and the second signal, and a reference clock detector detecting whether a reference clock for operating the storage device is received. The power management unit selectively supplies a power to the squelch circuit based on a result of the detection by the reference clock detector.

16 Claims, 20 Drawing Sheets

(56) References Cited

U.S. PATENT DOCUMENTS

| | | |
|---|---|---|
| 8,897,093 B2 | 11/2014 | Chen et al. |
| 9,684,361 B2 | 6/2017 | Park et al. |
| 9,952,791 B2 | 4/2018 | Jang et al. |
| 10,162,402 B2 | 12/2018 | Seo et al. |
| 2004/0123027 A1 | 6/2004 | Workman et al. |
| 2015/0205339 A1* | 7/2015 | Park .................. G06F 1/3278 |
| | | 713/323 |
| 2016/0231958 A1* | 8/2016 | Chin .................. G06F 1/3237 |
| 2019/0280848 A1* | 9/2019 | Kim .................. G06F 1/3287 |

* cited by examiner

STORAGE DEVICE CONFIGURED TO CHANGE POWER STATE BASED ON REFERENCE CLOCK FROM HOST DEVICE AND METHOD FOR OPERATING THE SAME

CROSS-REFERENCE TO RELATED APPLICATIONS

This application claims priority under 35 U.S.C. § 119 to Korean Patent Application No. 10-2020-0003793 filed on Jan. 10, 2020, in the Korean Intellectual Property Office, the disclosure of which is incorporated by reference herein in its entirety.

BACKGROUND

Example embodiments of the present disclosure described herein relate to a storage device. For example, at least some example embodiments relate to a storage device configured to change a power state based on a reference clock received from a host device.

An example of a non-volatile memory device, which retains data stored therein even though a power supply is blocked, from among semiconductor memory devices is a flash memory device, a phase change RAM (PRAM), a magnetic RAM (MRAM), a resistive RAM (RRAM), a ferroelectric RAM (FRAM), etc. There are various attempts for improving the performance of an interface between a memory device and a host device for the purpose of improving the performance of a semiconductor memory. As an example of the attempts, a universal flash storage (UFS) protocol for a storage device or a mobile device that requires low power consumption is adopted.

In addition to the adoption of protocols such as UFS, there is continuous development for further reducing power consumption of an electronic device, in particular, power consumption in an idle mode. In general, switching of a power state of a UFS storage device may be triggered based on a result of detecting, at a squelch circuit, a level change of signals input to input terminals of the UFS storage device. However, even in the case where the UFS storage device is in an idle state, the squelch circuit may need to be powered on to perform the detection of the level change, thereby causing unnecessary power consumption.

SUMMARY

Embodiments of the present disclosure relate to a storage device.

In some example embodiments, the storage device includes an interface circuit and a power manager. The interface circuit may be configured to exchange data with a host device, the interface circuit including, a first input terminal configured to receive a first signal from the host device, a second input terminal configured to receive a second signal from the host device, the second signal being complementary to the first signal, a squelch circuit configured to detect levels of the first signal and the second signal, and a reference clock detector configured to detect a receipt of a reference clock from the host device. The power manager may be configured to supply a power to the interface circuit such that the power manager selectively supplies the power to the squelch circuit based on whether the reference clock detector detects the receipt of the reference clock from the host device.

Some example embodiments of the inventive concepts relate to a storage system.

In some example embodiments, the storage system includes a host device and a storage device. The host device may have a first interface circuit including a transmit channel configured to transmit a first signal and a second signal, the second signal being complementary to the first signal. The storage device may have a second interface circuit including, a receive channel configured to receive the first signal and the second signal, a squelch circuit configured to detect levels of the first signal and the second signal, and a reference clock detector configured to detect a receipt of a reference clock from the host device. In some example embodiments, an operating mode of the storage device varies between an active mode and an idle mode based on whether the reference clock detector detects the receipt of the reference clock from the host device.

Some example embodiments relate to a method of operating a storage device including an interface circuit having a receive channel configured to receive a first signal and a second signal from a host device, and a squelch circuit configured to detect levels of the first signal and the second signal, the second signal being complementary to the first signal.

In some example embodiments, the method includes detecting, by a reference clock detector, a receipt of a reference clock from the host device; and selectively supplying, by a power manager, a power to the squelch circuit based on whether the reference clock detector detects the receipt of the reference clock from the host device.

BRIEF DESCRIPTION OF THE FIGURES

The above and other objects and features of example embodiments of the present disclosure will become apparent by describing in detail some example embodiments thereof with reference to the accompanying drawings.

DETAILED DESCRIPTION

Below, embodiments of the present disclosure may be described in detail and clearly to such an extent that an ordinary one in the art easily implements the present disclosure.

Components that are described in the detailed description with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
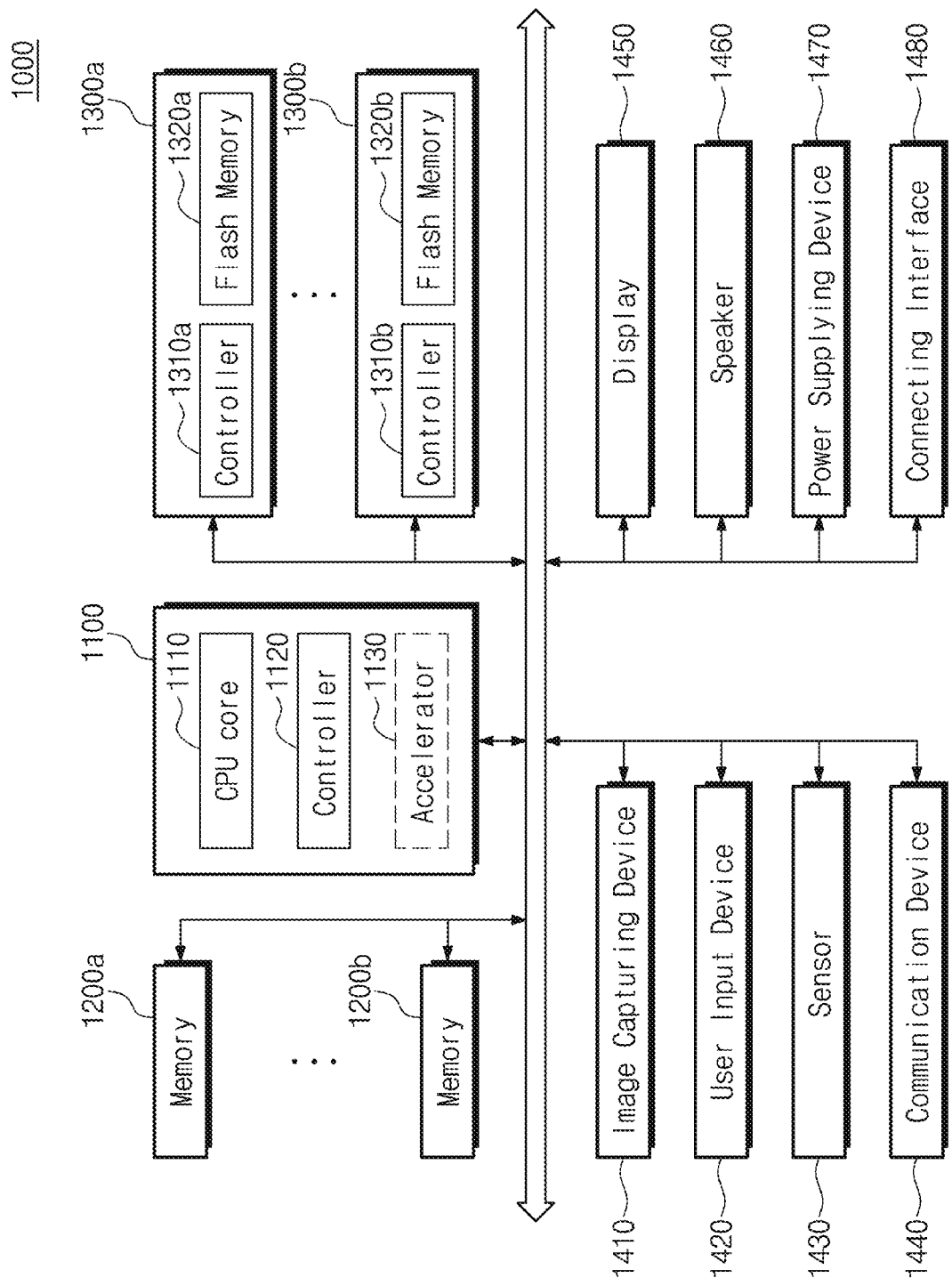
FIG. 1 illustrates a system to which a storage device according to an example embodiment of the present disclosure is applied.

FIG. 1 illustrates a system to which a storage device according to an embodiment of the present disclosure is applied. A system 1000 of FIG. 1 may be a mobile system such as a mobile phone, a smartphone, a tablet personal computer (PC), a wearable device, a healthcare device, or an Internet of Things (IoT) device. However, the system 1000 of FIG. 1 is not limited to the mobile system. For example, the system 1000 may be a personal computer, a laptop computer, a server, an automotive device, such as a media player or a navigation system, or the like.

Referring to FIG. 1, the system 1000 may include a main processor 1100, memories 1200a and 1200b, and storage devices 1300a and 1300b. The system 1000 may further include one or more of an image capturing device 1410, a user input device 1420, a sensor 1430, a communication device 1440, a display 1450, a speaker 1460, a power supplying device 1470, and a connecting interface 1480.

The main processor 1100 may control overall operations of the system 1000, in detail, may control operations of the remaining components of the system 1000. For example, the main processor 1100 may be implemented with a general-purpose processor, a dedicated processor, an application processor, or the like.

The main processor 1100 may include one or more CPU cores 1110 and may further include a controller 1120 for controlling the memories 1200a and 1200b and/or the storage devices 1300a and 1300b. In an example embodiment, the main processor 1100 may further include an accelerator block 1130 being a dedicated circuit for high-speed data calculation such as artificial intelligence (AI) data calculation. The accelerator block 1130 may include a graphics processing unit (GPU), a neural processing unit (NPU), and/or a data processing unit (DPU) and may be implemented with a separate chip physically independent of any other component of the main processor 1100.

The memories 1200a and 1200b may be used as a main memory device of the system 1000 and may include a volatile memory such as a static random access memory (SRAM) and/or a dynamic random access memory (DRAM). However, the memories 1200a and 1200b may include a non-volatile memory such as a flash memory, a phase change RAM (PRAM), and/or a resistive RAM (RRAM). It is possible to implement the memories 1200a and 1200b within the same package as the main processor 1100.

The storage devices 1300a and 1300b may function as a non-volatile memory device storing data regardless of whether a power is supplied and may have a relatively large storage capacity compared to the memories 1200a and 1200b. The storage device 1300a may include a storage controller 1310a and non-volatile memory (NVM) storage 1320a storing data under control of the storage controller 1310a, and the storage device 1300b may include a storage controller 1310b and non-volatile memory (NVM) storage 1320b storing data under control of the storage controller 1310b. Each of the non-volatile memory storages 1320a and 1320b may include a flash memory of a two-dimensional (2D) structure or a V-NAND flash memory of a three-dimensional structure or may include a different kind of non-volatile memory such as a PRAM or a RRAM.

The storage devices 1300a and 1300b may be included in the system 1000 in a state of being physically separated from the main processor 1100 or may be implemented within the same package as the main processor 1100. Alternatively, the storage devices 1300a and 1300b may be implemented in the form of a solid state drive (SSD) or a memory card. In this case, the storage devices 1300a and 1300b may be removably connected with any other components of the system 1000 through an interface to be described later, such as the connecting interface 1480. The storage devices 1300a and 1300b may include, but are not limited to, a device to which the standard such as universal flash storage (UFS) is applied.

The image capturing device 1410 may capture a still image or a moving image and may include a camera, a camcorder, and/or a webcam.

The user input device 1420 may receive various types of data input by a user of the system 1000 and may include a touch pad, a keypad, a keyboard, a mouse, and/or a microphone.

The sensor 1430 may detect various types of physical quantities capable of being obtained from the outside of the system 1000 and may convert the detected physical quantities to electrical signals. The sensor 1430 may include a temperature sensor, a pressure sensor, an illumination sensor, a position sensor, an acceleration sensor, a biosensor, and/or a gyroscope sensor.

The communication device 1440 may transmit and receive signals to and from external devices of the system 1000 in compliance with various communication protocols. The communication device 1440 may be implemented to include an antenna, a transceiver, and/or a MODEM.

The display 1450 and the speaker 1460 may function as output devices outputting visual information and auditory information to the user of the system 1000, respectively.

The power supplying device 1470 may appropriately convert a power supplied from a battery (not illustrated) embedded in the system 1000 and/or an external power source so as to be supplied to each component of the system 1000.

The connecting interface 1480 may provide a connection between the system 1000 and an external device capable of exchanging data with the system 1000 when connected with the system 1000. The connecting interface 1480 may be implemented with various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface.

Figure 2:
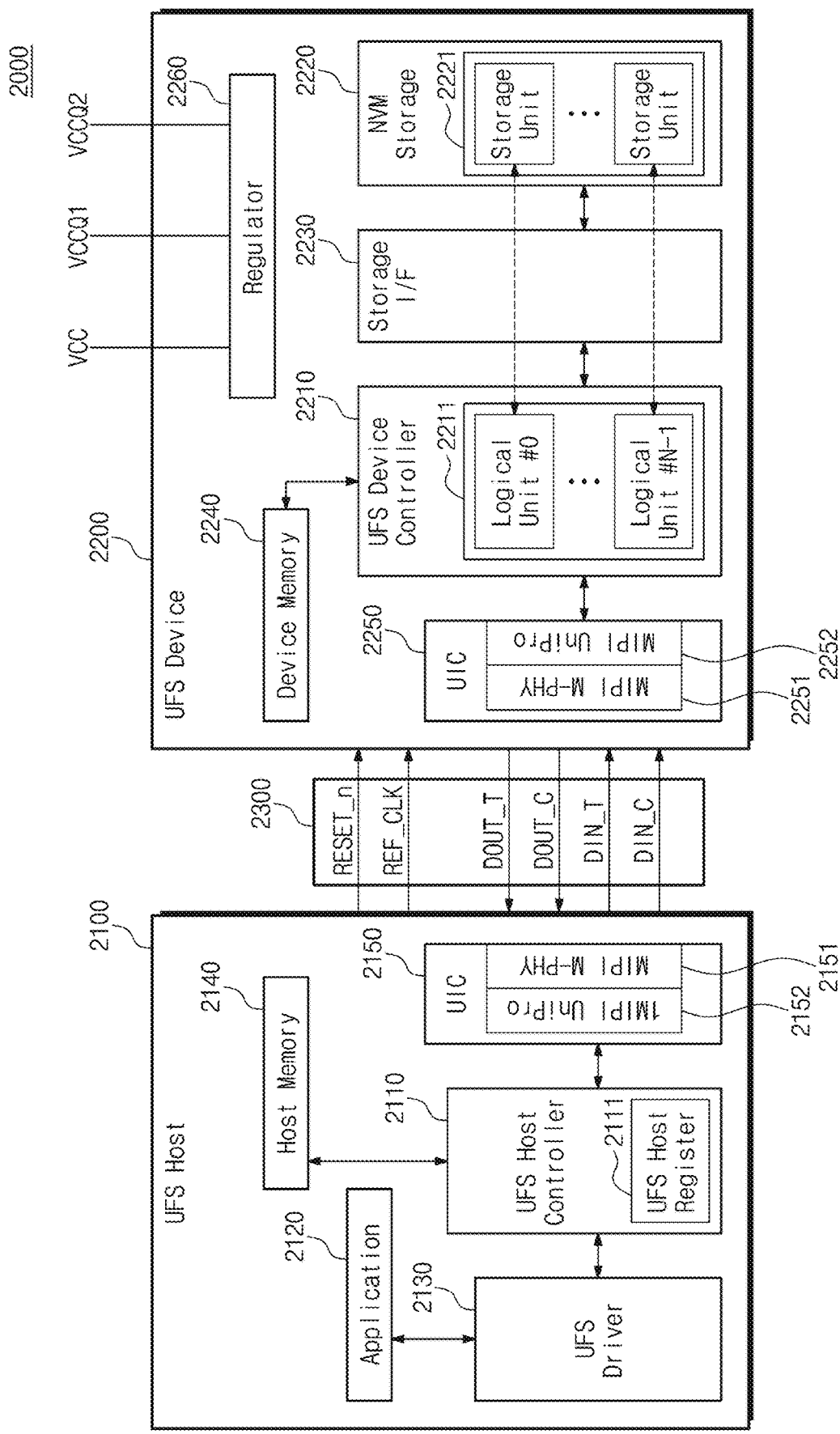
FIG. 2 illustrates a configuration of an UFS system according to an embodiment of the present disclosure.

FIG. 2 illustrates a configuration of a UFS system 2000 according to an example embodiment of the present disclosure. The UFS system 2000 that is a system complying with the UFS standard released by the JEDEC (Joint Electron Device Engineering Council) may include an UFS host 2100, an UFS device 2200, and an UFS interface 2300. The above description associated with the system 1000 of FIG. 1 may be applied to the UFS system 2000 of FIG. 2 unless contradictory to the following description to be given with reference to FIG. 2.

Referring to FIG. 2, the UFS host 2100 and the UFS device 2200 may be interconnected through the UFS interface 2300. In the case where the main processor 1100 of FIG. 1 is an application processor, the UFS host 2100 may be implemented as a part of the application processor. An UFS host controller 2110 and a host memory 2140 may correspond to the controller 1120 of the main processor 1100 and the memories 1200a and 1200b of FIG. 1, respectively. The UFS device 2200 may correspond to the storage devices 1300a and 1300b of FIG. 1, and an UFS device controller 2210 and a non-volatile memory storage 2220 may correspond to the storage controllers 1310a and 1310b and the non-volatile memory storages 1320a and 1320b of FIG. 1, respectively.

The UFS host 2100 may include the UFS host controller 2110, an application 2120, an UFS driver 2130, the host memory 2140, and an UFS interconnect (UIC) layer 2150. The UFS device 2200 may include the UFS device controller 2210, the non-volatile memory storage 2220, a storage interface 2230, a device memory 2240, an UIC layer 2250, and a regulator 2260. The non-volatile memory storage 2220 may be composed of a plurality of storage units 2221, and each storage unit 2221 may include a flash memory of a two-dimensional (2D) structure or a V-NAND flash memory of a three-dimensional structure or may include a different kind of non-volatile memory such as a PRAM or an RRAM. The UFS device controller 2210 and the non-volatile memory storage 2220 may be interconnected through the storage interface 2230. The storage interface 2230 may be implemented to comply with the standard such as Toggle or ONFI (Open NAND Flash Interface).

The application 2120 may mean a program that wants to communicate with the UFS device 2200 to use a function of the UFS device 2200. For an input/output associated with the UFS device 2200, the application 2120 may transfer an input-output request IOR to the UFS driver 2130. The input-output request IOR may mean, but is not limited to, a request for reading data, a request for writing data, and/or a request for discarding data.

The UFS driver 2130 may manage the UFS host controller 2110 through an UFS-HCI (Host Controller Interface). The UFS driver 2130 may convert an input-output request generated by the application 2120 to an UFS command defined by the UFS standard and may transfer the UFS command to the UFS host controller 2110. One input-output request may be converted to a plurality of UFS commands. An UFS command may basically be a command defined by the SCSI standard but may be a command dedicated for the UFS standard.

The UFS host controller 2110 may transfer the UFS command converted by the UFS driver 2130 to the UIC layer 2250 of the UFS device 2200 through the UIC layer 2150 and the UFS interface 2300. In this process, an UFS host register 2111 of the UFS host controller 2110 may perform a role of a command queue (CQ)

The UIC layer 2150 of the UFS host 2100 may include an MIPI M-PHY 2151 and an MIPI UniPro 2152, and the UIC layer 2250 of the UFS device 2200 may also include an MIPI M-PHY 2251 and an MIPI UniPro 2252.

The UFS interface 2300 may include a line of transferring a reference clock REF_CLK, a line of transferring a hardware reset signal RESET_n for the UFS device 2200, a pair of lines of transferring a differential input signal pair DIN_t and DIN_c, and a pair of lines of transferring a differential output signal pair DOUT_t and DOUT_c.

A frequency value of a reference clock that is provided from the UFS host 2100 to the UFS device 2200 may be, but is not limited to, one of the following frequency values: 19.2 MHz, 26 MHz, 38.4 MHz, and 52 MHz. The UFS host 2100 may change a frequency value of the reference clock even in operation, that is, even while data are exchanged between the UFS host 2100 and the UFS device 2200. The UFS device 2200 may generate clocks of various frequencies from the reference clock provided from the UFS host 2100, by using a phase-locked loop (PLL) or the like. Also, the UFS host 2100 may set a value of a data rate between the UFS host 2100 and the UFS device 2200 through a frequency value of the reference clock. That is, a value of the data rate may be determined depending on a frequency value of the reference clock.

The UFS interface 2300 may support multiple lanes, and each lane may be implemented with a differential pair. For example, the UFS interface 2300 may include one or more receive lanes and one or more transmit lanes. In FIG. 2, a pair of lines of transferring the differential input signal pair DIN_t and DIN_c may constitute a receive lane, and a pair of lines of transferring the differential output signal pair DOUT_t and DOUT_c may constitute a transmit lane. One transmit lane and one receive lane are illustrated in FIG. 2, but the number of transmit and receive lanes may be changed.

The receive lane and the transmit lane may allow data transmission in a serial communication manner, and a structure in which the receive lane and the transmit lane are separated from each other makes it possible for the UFS host 2100 and the UFS device 2200 to communicate with each other in a full-duplex manner. That is, while the UFS device 2200 receives data from the UFS host 2100 through the receive lane, the UFS device 2200 may transmit data to the UFS host 2100 through the transmit lane. Also, control data from the UFS host 2100 to the UFS device 2200, such as a command, and user data that the UFS host 2100 intends to write in the non-volatile memory storage 2220 of the UFS device 2200 or intends to read from the non-volatile memory storage 2220 thereof may be transferred through the same lane. As such, in addition to one receive lane and one transmit lane, a separate lane for data transmission may be further provided between the UFS host 2100 and the UFS device 2200.

The UFS device controller 2210 of the UFS device 2200 may overall control an operation of the UFS device 2200. The UFS device controller 2210 may manage the non-volatile memory storage 2220 through a logical unit (LU) 2211 being a logical data storage unit. The number of LUs 2211 may be, but is not limited to, "8". The UFS device controller 2210 may include a flash translation layer (FTL), and may translate a logical data address transferred from the UFS host 2100, that is, a logical block address (LBA) into a physical data address, for example, a physical block address (PBA) by using address mapping information of the FTL. In the UFS system 2000, a logical block for storing user data may have a size of a given range. For example, a minimum size of a logical block may be set to 4 Kbyte.

When a command from the UFS host 2100 is input to the UFS device 2200 through the UIC layer 2250, the UFS device controller 2210 may perform an operation corresponding to the input command; when the operation is completed, the UFS device controller 2210 may transfer a complete response to the UFS host 2100.

In an example embodiment, when the UFS host 2100 intends to write user data in the UFS device 2200, the UFS host 2100 may transfer a data write command to the UFS device 2200. When a response indicating ready-to-transfer is received from the UFS device 2200, the UFS host 2100 may transfer user data to the UFS device 2200. The UFS device controller 2210 may temporarily store the received user data in the device memory 2240 and may store the user data temporarily stored in the device memory 2240 at a selected location of the non-volatile memory storage 2220 based on address mapping information of the FTL.

In an example embodiment, when the UFS host 2100 intends to read user data stored in the UFS device 2200, the UFS host 2100 may transfer a data read command to the UFS device 2200. The UFS device controller 2210 may read user data from the non-volatile memory storage 2220 based on the data read command and may temporarily store the read user data in the device memory 2240. In this read process, the UFS device controller 2210 may detect and correct an error of the read user data by using an embedded error correction code (ECC) engine (not illustrated). The UFS device controller 2210 may transfer the user data temporarily stored in the device memory 2240 to the UFS host 2100. The UFS device controller 2210 may further include an advanced encryption standard (AES) engine (not illustrated). The AES engine may perform at least one of an encryption operation and a decryption operation on input data by using a symmetric-key algorithm.

The UFS host 2100 may store command to be transferred to the UFS device 2200 in the UFS host register 2111, capable of functioning as a command queue, depending on an order and may transmit the commands to the UFS device 2200 depending on the order. In this case, even though a previously transmitted command is yet being processed by the UFS device 2200, that is, even before a notification indicating that the previously transmitted command is completely processed by the UFS device 2200 is not received, the UFS host 2100 may transmit a next command queuing in the command queue to the UFS device 2200, and thus, the UFS device 2200 may also receive the next command from the UFS host 2100 even while processing the previously transmitted command. The maximum number of commands capable of being stored in the command queue, that is, a queue depth may be, for example, 32. The command queue may implemented in a type of a circular queue indicating a start and an end of commands queued therein through a head pointer and a tail pointer, respectively.

Each of the plurality of storage units 2221 may include a memory cell array (not illustrated) and a control circuit (not illustrated) controlling an operation of the memory cell array. The memory cell array may include a two-dimensional memory cell array or a three-dimensional memory cell array. The memory cell array may include a plurality of memory cells, and each memory cell may be a single level cell (SLC) storing 1-bit information or may be a cell storing information of two or more bits, such as a multi-level cell (MLC), a triple level cell (TLC), or a quadruple level cell (QLC). The three-dimensional memory cell array may include a vertical NAND string vertically oriented such that at least one memory cell is disposed above another memory cell.

As a power supply voltage, VCC, VCCQ1, VCCQ2, etc. may be input to the UFS device 2200. The power supply voltage VCC that is a main power supply voltage of the UFS device 2200 may have a value of 2.4 to 3.6 V. The power supply voltage VCCQ1 that is a power supply voltage for supplying a voltage of a low range may be mainly for the UFS device controller 2210 and may have a value of 1.14 to 1.26 V. The power supply voltage VCCQ2 that is smaller than the power supply voltage VCC but is a power supply voltage for supplying a voltage of a high range compared to the power supply voltage VCCQ1 may have a value of 1.7 to 1.95 V. The power supply voltages VCC, VCCQ1, and VCCQ2 may be supplied to components of the UFS device 2200 through the regulator 2260. The regulator 2260 may be implemented with a set of unit regulators each connected with a different power supply voltage of the above-described power supply voltages.

The regulator 2260 may manage power supply voltages that are provided to the components of the UFS device 2200. In an embodiment, the regulator 2260 may be implemented separately from a power management integrated circuit (PMIC) (not illustrated) or may be implemented as a part of the power management integrated circuit. The regulator 2260 may block a power supply voltage that is supplied to some components of the UFS device 2200, depending on an operation mode. The regulator 2260 may selectively apply a power supply voltage to a squelch circuit that detects that the UFS device 2200 switches from an idle mode to an active mode. For example, in the idle mode of the UFS device 2200, the regulator 2260 may block power supply voltage from being supplied to the squelch circuit.

The UFS device 2200 may receive a reference clock REF_CLK from the outside of the UFS device 2200 (e.g., from the UFS host 2100), and may be used to operate the UFS device 2200. For example, a phase locked loop (not illustrated) included in at least one of various components constituting the UFS device 2200 may generate a clock to operate the UFS device 2200, based on the reference clock REF_CLK.

Meanwhile, in the case where the UFS device 2200 enters the idle mode, the UFS host 2100 may not provide the reference clock REF_CLK to the UFS device 2200. The UIC layer 2250 may detect that the reference clock REF_CLK is not provided. The UIC layer 2250 may generate a trigger signal for allowing the UFS device 2200 to enter the idle mode, based on a result of the detection. As discussed below, in example embodiments, the regulator 2260 may block a power supply voltage that is applied to at least some components of the UFS device 2200. In particular, the regulator 2260 may block a power supply voltage that is applied to the squelch circuit of the UIC layer 2250.

Further, as discussed below in example embodiments, in the case where the UFS device 2200 enters the active mode from the idle mode, the UFS host 2100 may provide the reference clock REF_CLK to the UFS device 2200, and the UIC layer 2250 may detect the reference clock REF_CLK. The UIC layer 2250 may generate a trigger signal for allowing the UFS device 2200 to enter the active mode, based on a result of the detection. The regulator 2260 may again apply a power supply voltage to components of the UFS device 2200 (e.g., the squelch circuit of the UIC layer 2250, the UFS device controller 2210, and the non-volatile memory storage 2220).

Conventionally, the squelch circuit of the UIC layer 2250 may be powered on regardless of whether the UFS device 2200 enters the idle mode to allow the squelch circuit to detect a level change of a signal input to an input terminal of the storage device. However, such a configuration may be difficult to manage a power in the idle mode. In contrast, according one or more example embodiments, the squelch circuit may be powered off in the idle mode and a mode switch between the idle mode and the active mode is made based on detecting whether the reference clock REF_CLK is supplied or is blocked. Accordingly, power consumption of the UFS device 2200 in the idle mode may be efficiently managed.

Figure 3:
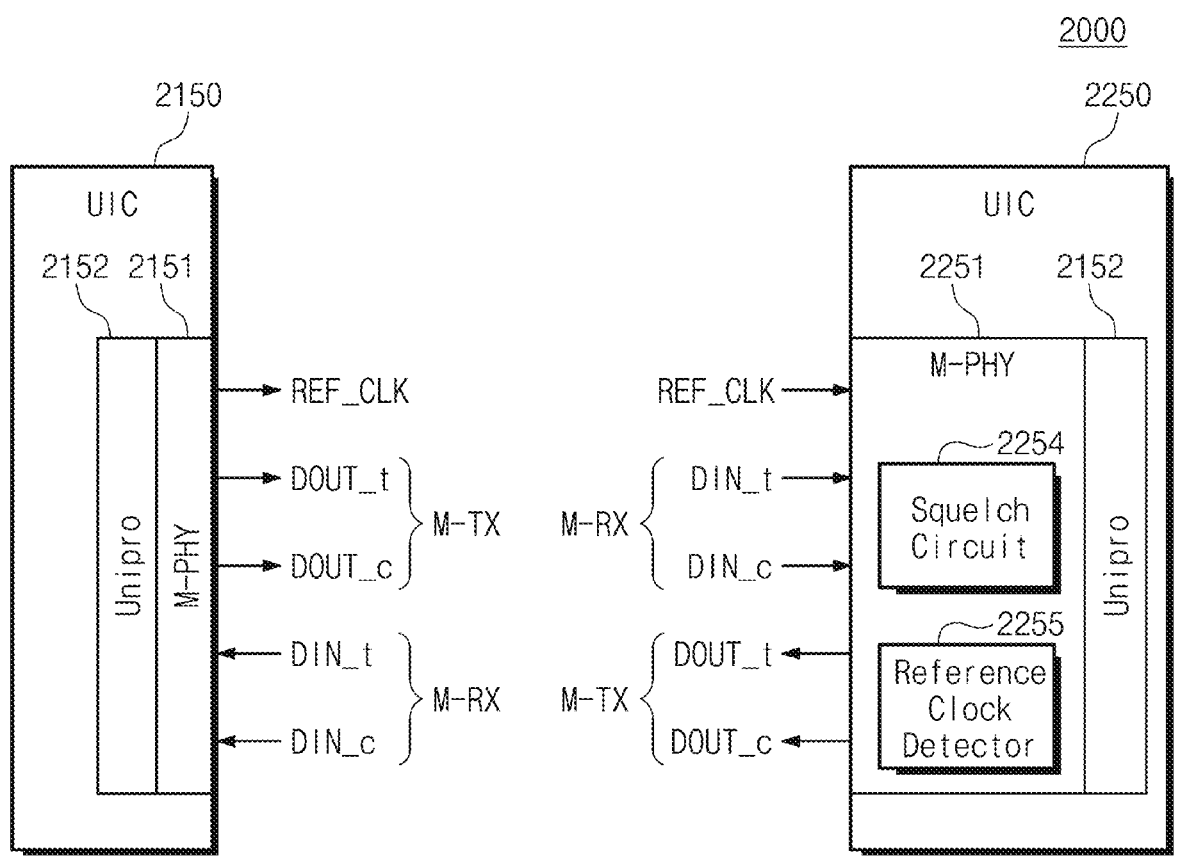
FIG. 3 illustrates signals which are exchanged between an UIC layer of an UFS host and an UIC layer of the UFS device, in an UFS system of FIG. 2.

FIG. 3 illustrates signals which are exchanged between the UIC layer 2150 of the UFS host 2100 and the UIC layer 2250 of the UFS device 2200, in the UFS system 2000 of FIG. 2.

A physical layer (M-PHY) 2151 of the UIC layer 2150 may transfer signals to the UIC layer 2250 through the output terminals DOUT_t and DOUT_c. The output terminals DOUT_t and DOUT_c may constitute a transmit channel M-TX of the UIC layer 2150. For example, the signals that are transferred through the output terminals DOUT_t and DOUT_c may be a pair of differential signals. That is, a signal that is transferred through the output terminal DOUT_c may be complementary to a signal that is transferred through the output terminal DOUT_t.

The physical layer (M-PHY) 2151 of the UIC layer 2150 may receive signals from the UIC layer 2250 through the input terminals DIN_t and DIN_c. The input terminals DIN_t and DIN_c may constitute a receive channel M-RX of the UIC layer 2150. For example, the signals that are received through the input terminals DIN_t and DIN_c may be a pair of differential signals. That is, a signal that is received through the input terminal DIN_c may be complementary to a signal that is received through the input terminal DIN_t.

The output terminals DOUT_t and DOUT_c and the input terminals DIN_t and DIN_c may be controlled to one of various states in compliance with a given protocol. For example, each of the output terminals DOUT_t and DOUT_c and the input terminals DIN_t and DIN_c may be controlled to a positive state DIF-P, a negative state DIF-N, a ground state DIF-Z, or a floating state DIF-Q.

When a level (e.g., a voltage level) of an output signal of the first output terminal DOUT_t is higher than a level of an output signal of the second output terminal DOUT_c, the output terminals DOUT_t and DOUT_c may be at the positive state DIF-P. When the level of the output signal of the first output terminal DOUT_t is lower than the level of the output signal of the second output terminal DOUT_c, the output terminals DOUT_t and DOUT_c may be at the negative state DIF-N. When the first output terminal DOUT_t and the second output terminal DOUT_c are floated, the output terminals DOUT_t and DOUT_c may be at the floating state DIF-Q. When the levels of the first output terminal DOUT_t and the second output terminal DOUT_c are equal, the output terminals DOUT_t and DOUT_c may be at the ground state DIF-Z.

When a level of an input signal of the first input terminal DIN_t is higher than a level of an input signal of the second input terminal DIN_c, the input terminals DIN_t and DIN_c may be at the positive state DIF-P. When the level of the input signal of the first input terminal DIN_t is lower than the level of the input signal of the second input terminal DIN_c, the input terminals DIN_t and DIN_c may be at the negative state DIF-N. When the first input terminal DIN_t and the second input terminal DIN_c are connected with terminals of a ground state, the input terminals DIN_t and DIN_c may be at the ground state DIF-Z. When the first input terminal DIN_t and the second input terminal DIN_c are floated, the input terminals DIN_t and DIN_c may be at the floating state DIF-Q.

The output terminals DOUT_t and DOUT_c of the UIC layer 2250 may correspond to the input terminals DIN_t and DIN_c of the UIC layer 2150, and the input terminals DIN_t and DIN_c of the UIC layer 2250 may correspond to the output terminals DOUT_t and DOUT_c of the UIC layer 2150.

A physical layer (M-PHY) 2251 of the UIC layer 2250 may receive signals through the input terminals DIN_t and DIN_c and may transfer signals through the output terminals DOUT_t and DOUT_c. As in the above description given with reference to the UIC layer 2150, the output terminals DOUT_t and DOUT_c and the input terminals DIN_t and DIN_c of the UIC layer 2250 may be controlled to the positive state DIF-P, the negative state DIF-N, the ground state DIF-Z, or the floating state DIF-Q.

Meanwhile, according to the MIPI M-PHY specification, the physical layer (M-PHY) 2251 of the UIC layer 2250 may be configured to detect levels of the input terminals DIN_t and DIN_c. In an example embodiment, the physical layer (M-PHY) 2251 may include a squelch circuit 2254 for detecting levels of the input terminals DIN_t and DIN_c as a way to detect levels of terminals. In addition, the physical layer (M-PHY) 2251 according to example embodiments may further include a reference clock detector 2255. The squelch circuit 2254 and/or the reference clock detector 2255 may detect a change between the idle mode and the active mode of the UFS device 2200.

When the UFS device 2200 does not execute any operation, the UFS device 2200 may be in a first idle mode or a second idle mode. When the UFS device 2200 is in the first idle mode or the second idle mode, the UIC layer 2150 may not transfer the reference clock REF_CLK to the UIC layer 2250. When the UFS device 2200 switches from the first idle mode and/or the second idle mode to the active mode, the input terminals DIN_t and DIN_c of the UIC layer 2250 may switch from the floating state DIF-Q to the negative state DIF-N. When the UFS device 2200 switches from the first idle mode and/or the second idle mode to the active mode, the UIC layer 2150 may resume a transfer of the reference clock REF_CLK to the UIC layer 2250.

In example embodiment, when the UFS device 2200 is in the first idle mode, the squelch circuit 2254 may be in an active state (i.e., in a state where a power supply voltage is supplied thereto). Accordingly, when the UFS device 2200 switches from the first idle mode to the active mode, the squelch circuit 2254 may detect that the input terminals DIN_t and DIN_c of the UIC layer 2250 switch from the floating state DIF-Q to the negative state DIF-N. The squelch circuit 2254 may generate a trigger signal for allowing the UFS device 2200 to enter the active mode, based on a result of the detection.

In example embodiment, when the UFS device 2200 is in the second idle mode, the squelch circuit 2254 may be in an inactive state (i.e., in a state where a power supply voltage is not supplied thereto). Instead, the reference clock detector 2255 may generate the trigger signal for allowing the UFS device 2200 to enter the active mode, based on toggling of the reference clock REF_CLK.

In general, to detect a switch of the input terminals DIN_t and DIN_c from the floating state DIF-Q to the negative state DIF-N may require power consumption greater than the power consumption utilized to detect toggling of a clock. Accordingly, the power consumption of the reference clock detector 2255 may be smaller than the power consumption of the squelch circuit 2254. In other words, the power consumption of the UFS device 2200 in the second idle mode may be smaller than the power consumption of the UFS device 2200 in the first idle mode.

Figure 4:
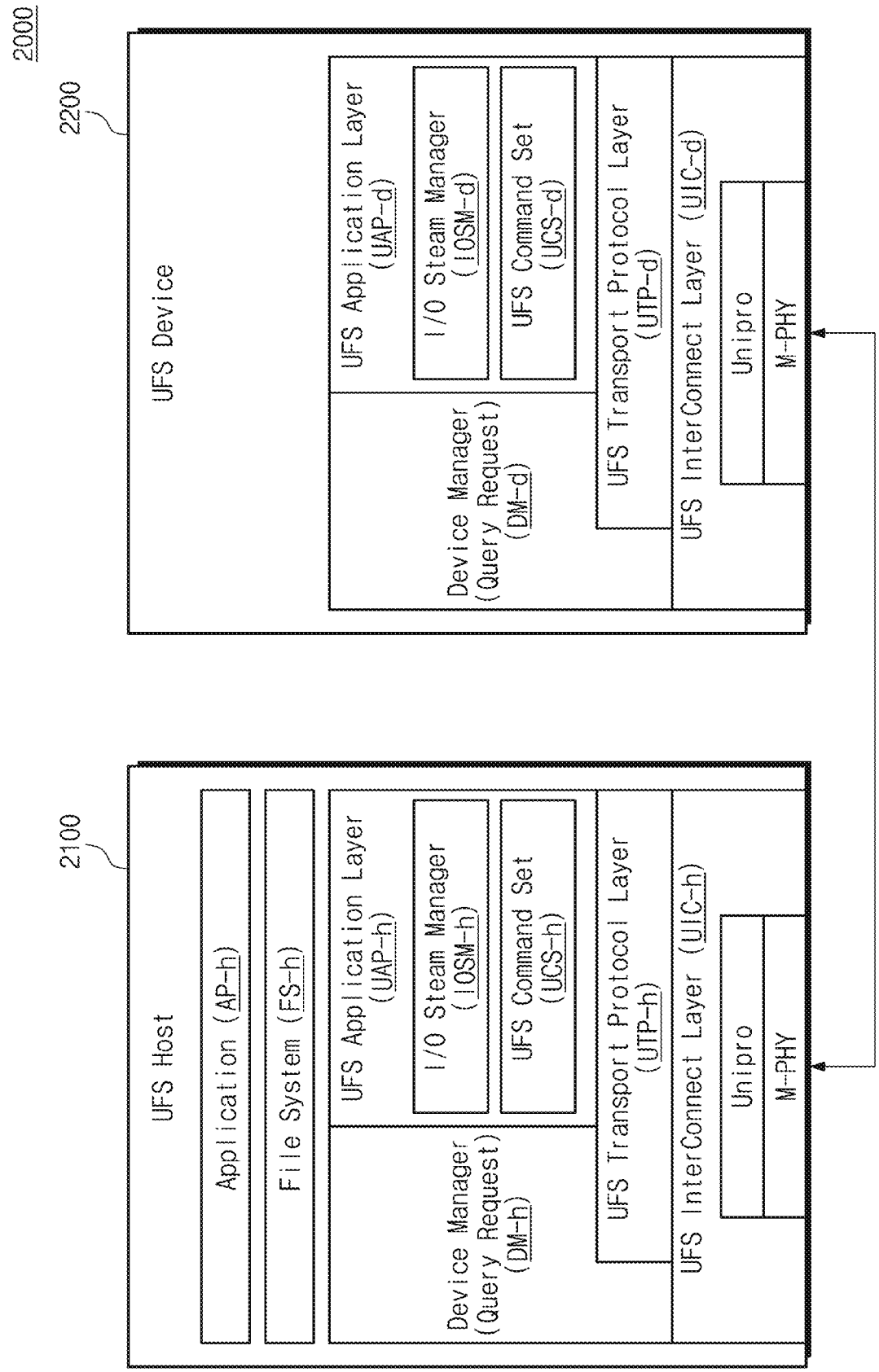
FIG. 4 illustrates a layer structure complying with an interface protocol, which is applicable to a storage system of FIGS. 2 and 3.

FIG. 4 illustrates a layer structure complying with an interface protocol, which is applicable to a storage system of FIGS. 2 and 3.

Referring to FIGS. 1-3, the UFS host 2100 may include physical hardware circuits and/or a program code executable by a processor for the purpose of performing unique functions of an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven on the UFS host 2100. The application AP-h that is an upper layer may handle a request from a user of the system 1000. The application AP-h may handle normal commands such as a read command and a write command. The application AP-h may provide a control of a device level such as a query request.

The file system FS-h may organize and manage a variety of data (files) generated by the application AP-h. The file system FS-h may generate a logical address corresponding to an access request (e.g., a write request or the like) to the UFS device 2200. For example, the file system FS-h may include FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, etc.

The UFS application layer UAP-h is configured to support various commands between the UFS host 2100 and the UFS device 2200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an embodiment, the I/O stream manager IOSM-h may be configured to identify a specific value of an input/output from the application AP-h or the file system FS-h. The I/O stream manager IOSM-h may be configured to manage a priority of a request from the application AP-h or the file system FS-h or to support various functions corresponding to the request from the application AP-h or the file system FS-h.

The UFS command set UCS-h may support various command sets that are supported between the UFS host 2100 and the UFS device 2200. For example, the UFS command set UCS-h may include a UFS native command set and a UFS SCSI command set. The UFS command set UCS-h may configure a command to be transferred to the UFS device 2200 depending on a request from the application AP-h or the file system FS-h.

Although not illustrated in drawing, the UFS application layer UAP-h may further include a task manager that processes commands for a control of a command queue.

The device manager DM-h may manage operations of a device level and configurations of a device level. For example, the device manager DM-h may manage a query request for setting or checking a variety of information.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an embodiment, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the UFS device 2200. The UFS interconnect layer UIC-h may include hardware components, which are physically connected with a UFS interconnect layer UIC-d of the UFS device 2200, such as an MIPI Unipro and an MIPI M-PHY. The UFS interconnect layer UIC-h and the UFS transport protocol layer UTP-h may communicate with each other through a UIC-SAP, and the UFS interconnect layer UIC-h and the device manager DM-h may communicate with each other through a UIO-SAP.

Although not illustrated in drawing, the UFS host 2100 may further include a device driver. The device driver may control a device and/or a layer included in the UFS host 2100. The device driver may convert a request (e.g., a write request or the like) for the UFS device 2200 generated by the file system FS-h to a command capable of being identified by the UFS device 2200. For example, the file system FS-h and the device driver may be included in an operating system (OS), and the application AP-h may be installed in the OS. The device driver may control a communication with the UFS device 2200 while managing a hardware resource.

The UFS device 2200 may include physical hardware circuits and/or a program code executable by a processor for the purpose of performing unique function(s) of a device manager DM-d, a UFS application layer UAP-d, a UFS transport protocol layer UTP-d, and the UFS interconnect layer UIC-d. A configuration of the UFS application layer UAP-d, the UFS transport protocol layer UTP-d, and the UFS interconnect layer UIC-d may be understood as a configuration that is similar to that of the UFS application layer UAP-h, the UFS transport protocol layer UTP-h, and the UFS interconnect layer UIC-h of the UFS host 2100 and performs a logical communication between corresponding layers, and thus, additional description will be omitted to avoid redundancy.

However, unlike the physical layer M-PHY of the UFS interconnect layer UIC-h, the physical layer M-PHY of the UFS interconnect layer UIC-d may monitor the reference clock REF_CLK received from the UFS host 2100. When a monitoring result indicates that an input of the reference clock REF_CLK is suspended in the active mode of the UFS device 2200, a power supply voltage that is provided to at least some components (in particular, the squelch circuit 2254 of FIG. 2) of the UFS device 2200 may be blocked. When the monitoring result indicates that an input of the reference clock REF_CLK is detected in the idle mode of the UFS device 2200, the supply of a power supply voltage to components of the UFS device 2200 may be resumed.

Meanwhile, the above hierarchical structure and function of each of the UFS host 2100 and the UFS device 2200 are examples and are to help understanding of the present disclosure. Accordingly, the present disclosure is not limited thereto.

Figure 5:
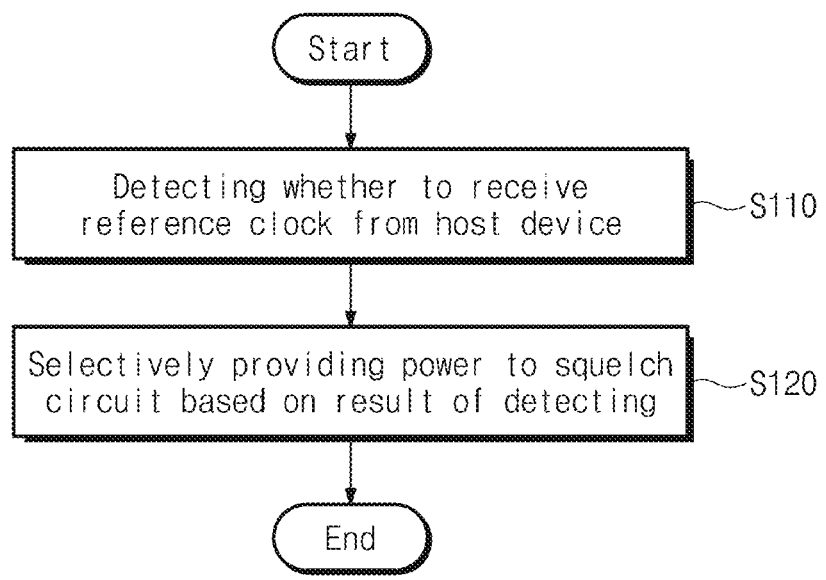
FIG. 5 illustrates an operating method of an UFS device of FIGS. 2 to 4.

FIG. 5 illustrates an operating method of the UFS device 2200 of FIGS. 2 to 4.

Referring to FIGS. 1-4, in S110, the UFS device 2200 (e.g., the reference clock detector 2255) may detect whether the reference clock REF_CLK is received from the UFS host 2100. When the UFS device 2200 is in the active mode, the UFS host 2100 may transfer the reference clock REF_CLK to the UFS device 2200. However, in the case where the UFS host 2100 enters the idle mode, the UFS host 2100 may not provide the reference clock REF_CLK to the UFS device 2200.

In the case where the input of the reference clock REF_CLK is suspended while the UFS device 2200 is in the active mode, it may mean that the UFS device 2200 is scheduled to enter the idle mode. Accordingly, the reference clock detector 2255 may generate a first trigger signal corresponding to entering the idle mode in response to that the input of the reference clock REF_CLK is suspended In the case where the input of the reference clock REF_CLK is resumed while the UFS device 2200 is in the idle mode, it may mean that the UFS device 2200 is scheduled to enter the active mode. Accordingly, the reference clock detector 2255 may generate a second trigger signal corresponding to entering the active mode in response to that the input of the reference clock REF_CLK is resumed In operation S120, the UFS device 2200 (e.g., the regulator 2260) may selectively supply a power to the squelch circuit 2254, based on a result of the detection. For example, when the UFS device 2200 is in the active mode, the regulator 2260 (refer to FIG. 2) may suspend a power supply to at least some components of the UFS device 2200 in response to the first trigger signal. In particular, the regulator 2260 may block a power being supplied to the squelch circuit 2254 in response to the first trigger signal. For example, when the UFS device 2200 is in the idle mode, the regulator 2260 may resume a power supply to at least some components of the UFS device 2200 in response to the second trigger signal.

Figure 6:
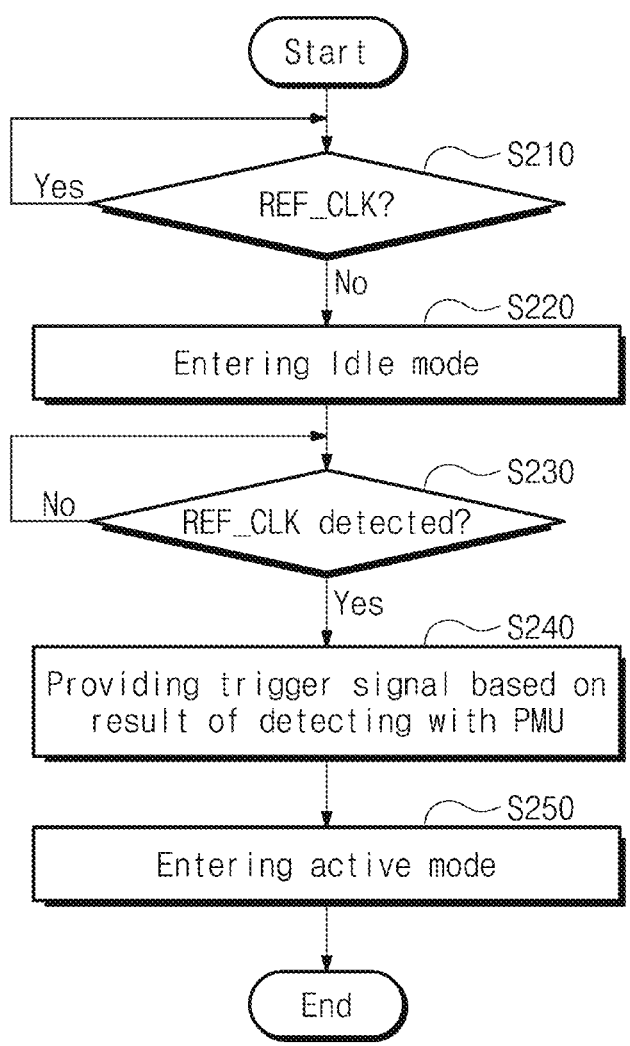
FIG. 6 illustrates an operating method of an UFS device of FIGS. 2 to 4.

FIG. 6 illustrates an operating method of the UFS device 2200 of FIGS. 2 to 4.

Referring to FIGS. 1-5, in operation S210, the UFS device 2200 may monitor the reference clock REF_CLK that is received from the UFS host 2100. When a monitoring result indicates that the reference clock REF_CLK is consistently received (Yes), the monitoring result may mean that the UFS device 2200 is in the active mode. Accordingly, the UFS device 2200 may continue to monitor the reference clock REF_CLK. In contrast, when the monitoring result indicates that the reference clock REF_CLK is not received (No), the monitoring result may mean that the UFS host 2100 has entered the idle mode and that the UFS device 2200 is scheduled to enter the idle mode.

In operation S220, when the reference clock REF_CLK is not detected during a given time, the UFS device 2200 may enter the idle mode. For example, the reference clock detector 2255 may generate a trigger signal for allowing the UFS device 2200 to enter the idle mode. A power management unit (e.g., the regulator 2260 of FIG. 2) may block a power supply voltage being applied to at least some components (in particular, the squelch circuit 2254) of the UFS device 2200 in response to the trigger signal, and the UFS device 2200 may enter the idle mode.

For example, the idle mode may correspond to a hibernate state HIBERN8 called in the MIPI M-PHY specification. For example, the idle mode may correspond to a stall state STALL or a sleep state SLEEP called in the MIPI M-PHY specification. For example, the hibernate state HIBERN8, the stall state STALL, and the sleep state SLEEP may be collectively referred to as a "power saving state".

However, even though the UFS device 2200 is in the idle mode, the supplying of a power supply voltage to at least some components of the UIC layer 2250 may be maintained. Accordingly, a physical connection between the UIC layer 2150 and the UIC layer 2250 may not be completely broken in the idle mode. For example, a Unipro link startup sequence for the physical connection may not be required.

As the UFS device 2200 enters the idle mode, the input terminals DIN_t and DIN_c of the UIC layer 2250 may be maintained at the floating state DIF-Q, and the UIC layer 2150 may not transfer the reference clock REF_CLK to the UIC layer 2250.

In operation S230, the reference clock detector 2255 may consistently monitor whether the reference clock REF_CLK is received from the UFS host 2100. The UFS device 2200 may determine that the UFS host 2100 is being maintained in the idle mode when the reference clock REF_CLK is not detected (No in operation S230). In contrast, the UFS device 2200 may determine that the UFS host 2100 enters the active mode when the reference clock REF_CLK is detected (Yes in operation S230).

In operation 240, the reference clock detector 2255 may generate a trigger signal for allowing the UFS device 2200 to enter the active mode.

In operation S240, the regulator 2260 (refer to FIG. 2) may resume the supplying of the power supply voltage to the UFS device 2200 (in particular, to the squelch circuit 2254) in response to the trigger signal, and the UFS device 2200 may enter the active mode.

Figure 7A:
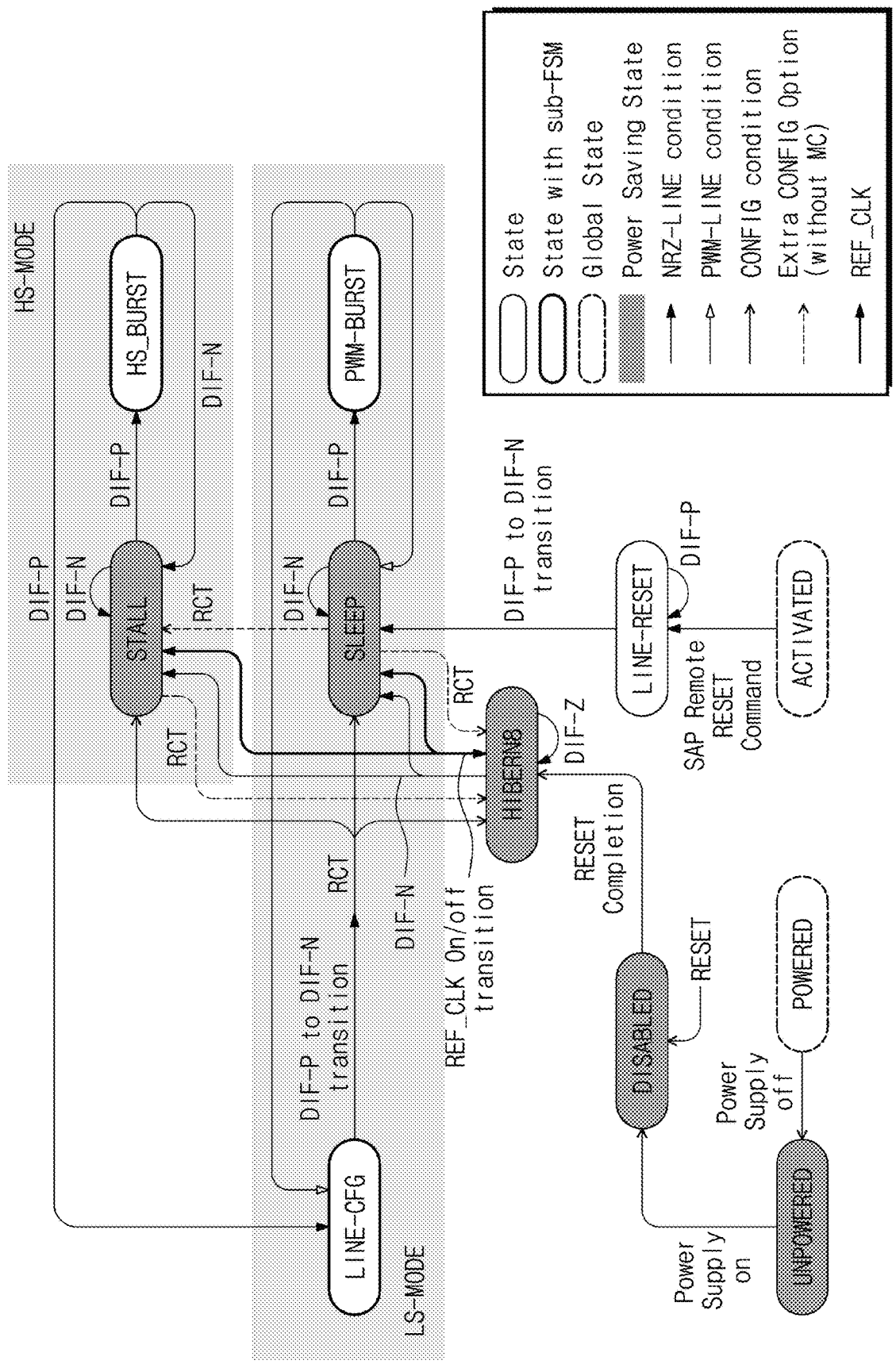
FIGS. 7A and 7B illustrate state machines of an UIC layer of FIGS. 2 to 4.
Figure 7B:
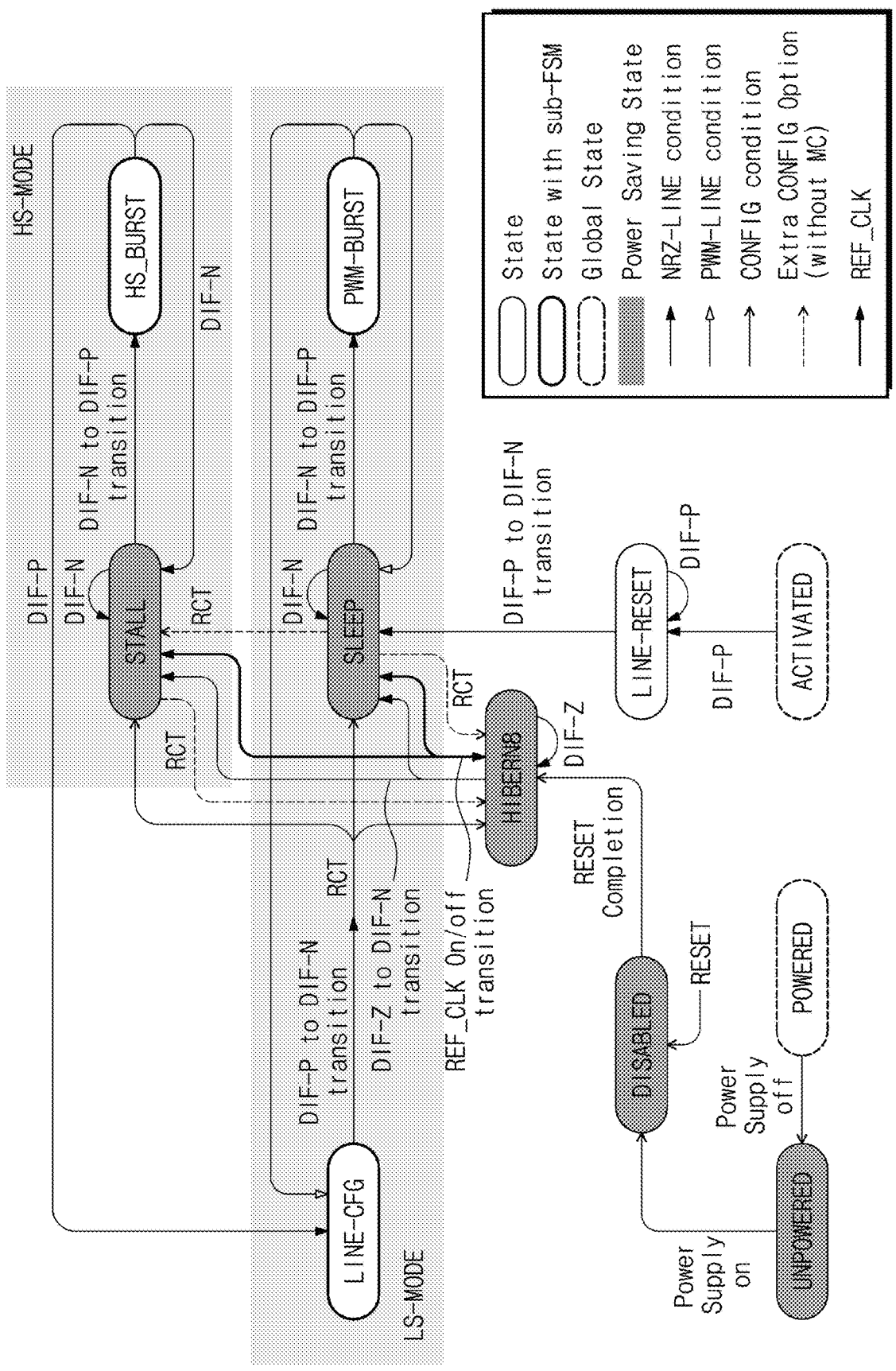

FIGS. 7A and 7B illustrate state machines of the UIC layer 2250 of FIGS. 1 to 3. In detail, FIG. 7A illustrates state machines of the output terminal M-TX of the UIC layer 2150, and FIG. 7B illustrates a state machine of the input terminal M-RX of the UIC layer 2250. For example, the state machines of FIGS. 6A and 6B may be associated with a Type-I module defined in the M-PHY protocol.

Referring to FIGS. 2 to 4, 7A, and 7B, the M-PHY protocol defines a high speed mode HS-MODE and a low speed mode LS-MODE of the UIC layer 2250. Each of the high speed mode HS-MODE and the low speed mode LS-MODE may include a burst data transmission mode and a power saving state. In addition, the M-PHY protocol defines a hibernate state HIBERN8 being an ultra-low power state. The power saving state of the high speed mode HS-MODE may be the stall state STALL, and the power saving state of the low speed mode LS-MODE may be the sleep state SLEEP.

For example, the sleep state SLEEP and the stall state STALL of FIGS. 7A and 7B may correspond to the active mode described with reference to FIGS. 2 to 6, and the hibernate state HIBERN8 may correspond to the idle mode described with reference to FIGS. 2 to 6.

The UFS device 2200 may perform a mode switch even between the sleep state SLEEP or the stall state STALL being the power saving state and the hibernate state HIBERN8 being the ultra-low power state. For example, in the hibernate state HIBERN8, a power supply voltage may not be supplied to at least some components of the UIC layer 2250. However, in the hibernate state HIBERN8, a power supply voltage may be supplied to some components of the UIC layer 2250. That is, the hibernate state HIBERN8 may be a state in which the Unipro link startup sequence for a physical connection between the UIC layer 2150 and the UIC layer 2250 is not required.

As illustrated in drawing, in the case where the UIC layer 2250 is in the hibernate state HIBERN8, the UFS host 2100 may not provide the reference clock REF_CLK to the UFS device 2200. In the case where the UIC layer 2250 is in the sleep state SLEEP or the stall state STALL, the UFS host 2100 may provide the reference clock REF_CLK to the UFS device 2200.

Unlike a general case, according to the present disclosure, in the case where the UIC layer 2250 is in the hibernate state HIBERN8, a power supply voltage may not be supplied to the squelch circuit 2254. Accordingly, upon switching from the hibernate state HIBERN8 to the sleep state SLEEP or the stall state STALL, even though levels of the output terminals DOUT_t and DOUT_c change from DIF-Z to DIF-N, the squelch circuit 2254 fails to detect the change from DIF-Z to DIF-N. Instead, the reference clock detector 2255 may detect toggling of the reference clock REF_CLK received from the UIC layer 2150 and may generate a trigger signal for allowing the UFS device 2200 to enter the active mode based on a result of the detection.

Figure 8A:
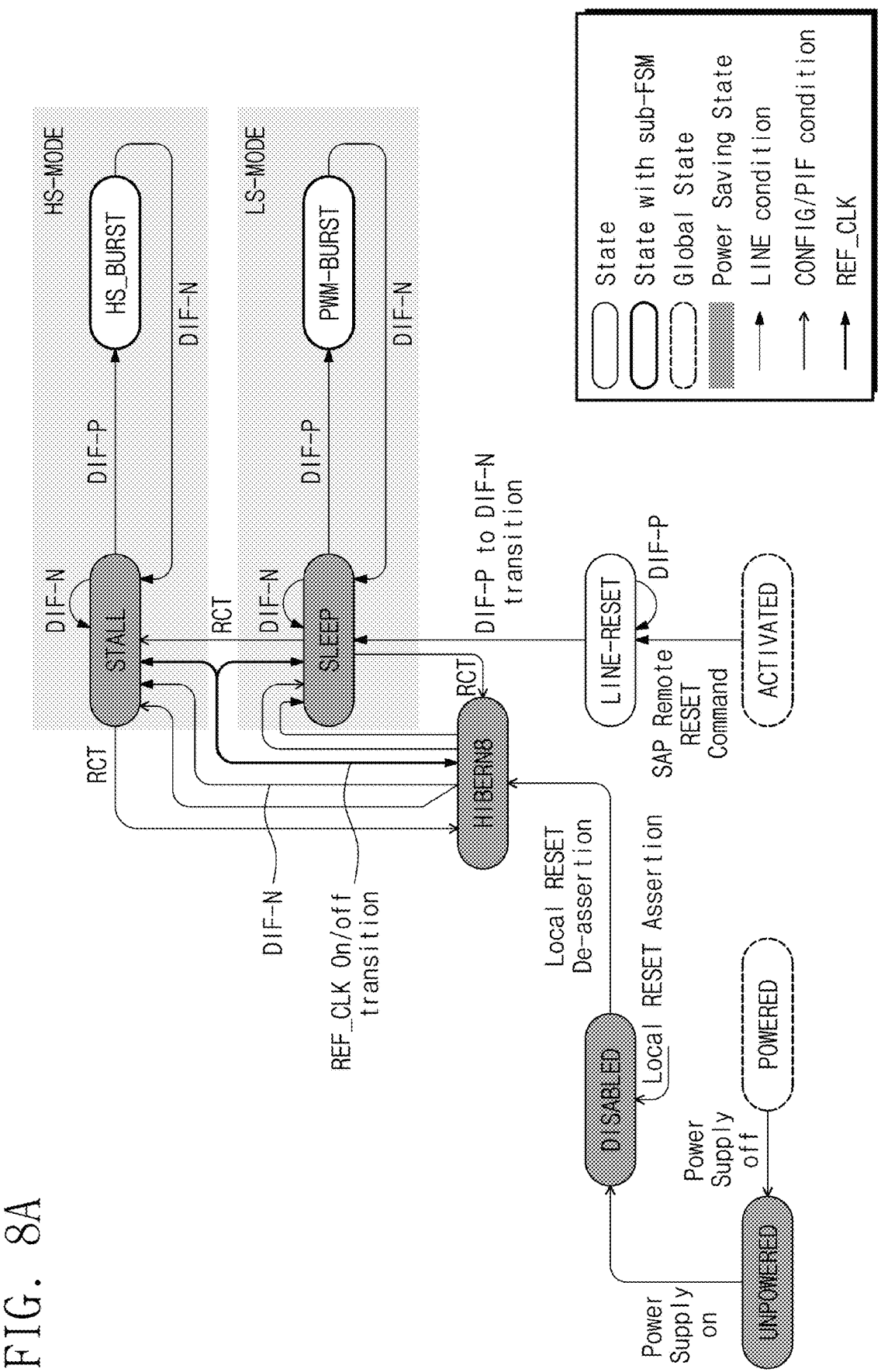
FIGS. 8A and 8B illustrate state machines of an UIC layer of FIGS. 2 to 4.
Figure 8B:
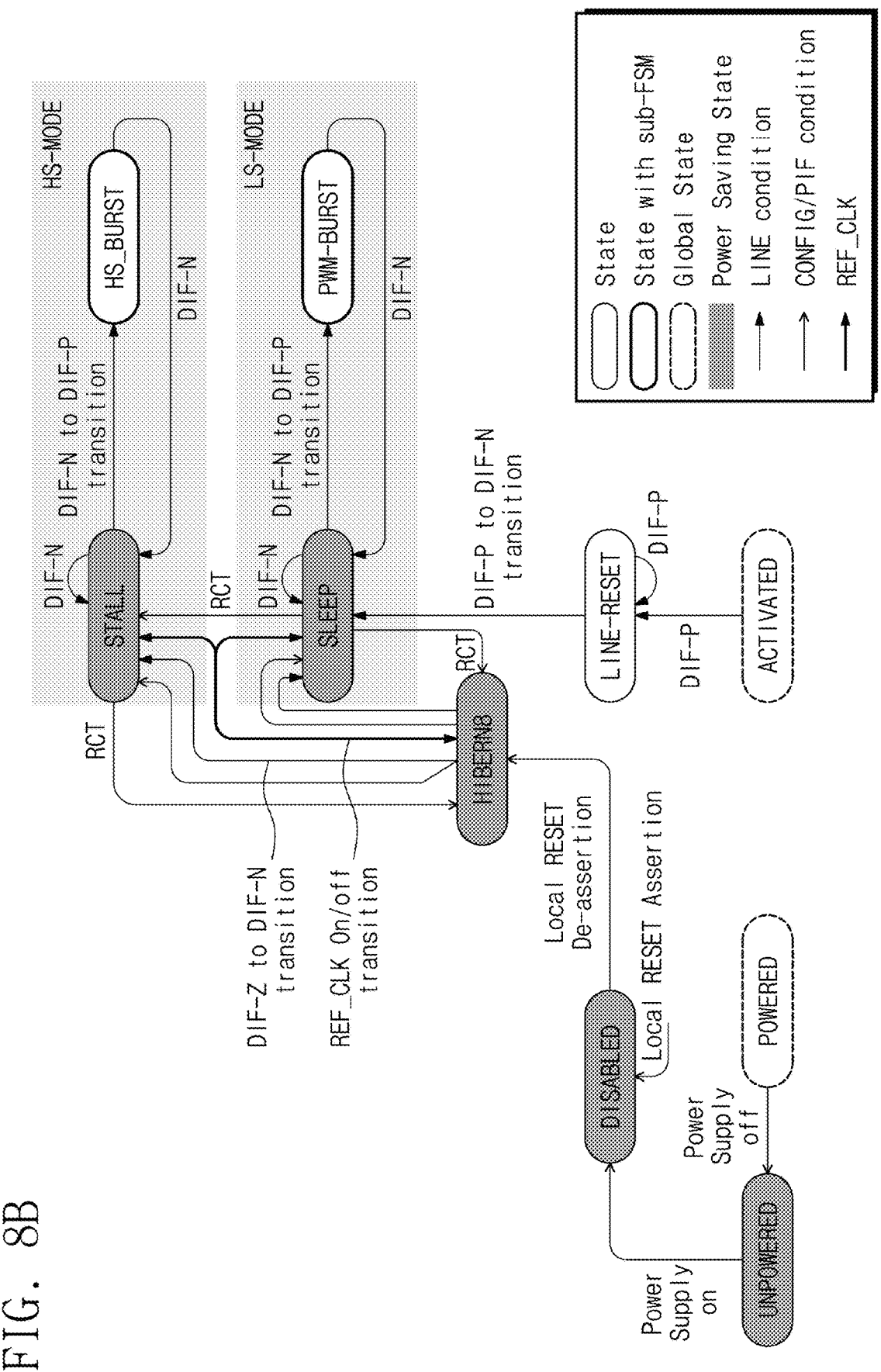

FIGS. 8A and 8B illustrate state machines of the UIC layer 2250 of FIGS. 2 to 4. In detail, FIG. 8A illustrates a state machine of the output terminal M-TX of the UIC layer 2150, and FIG. 8B illustrates a state machine of the input terminal M-RX of the UIC layer 2250. For example, the state machines of FIGS. 8A and 8B may be associated with a Type-II module defined in the M-PHY protocol.

The state machines of FIGS. 8A and 8B are mostly similar to the state machines of FIGS. 7A and 7B except that a LINE-CFG state is not defined. For example, in the case where the UIC layer 2250 is in the hibernate state HIBERN8, the UFS host 2100 may not provide the reference clock REF_CLK to the UFS device 2200. In the case where the UIC layer 2250 is in the sleep state SLEEP or the stall state STALL, the UFS host 2100 may provide the reference clock REF_CLK to the UFS device 2200.

The reference clock detector 2255 of the present disclosure detects toggling of the reference clock REF_CLK received from the UIC layer 2150 and generates a trigger signal for changing an operating mode of the UFS device 2200 based on a result of the detection. In the case where the UIC layer 2250 is in the hibernate state HIBERN8, as described with reference to FIGS. 7A and 7B, a power is not supplied to the squelch circuit 2254.

Figure 9:
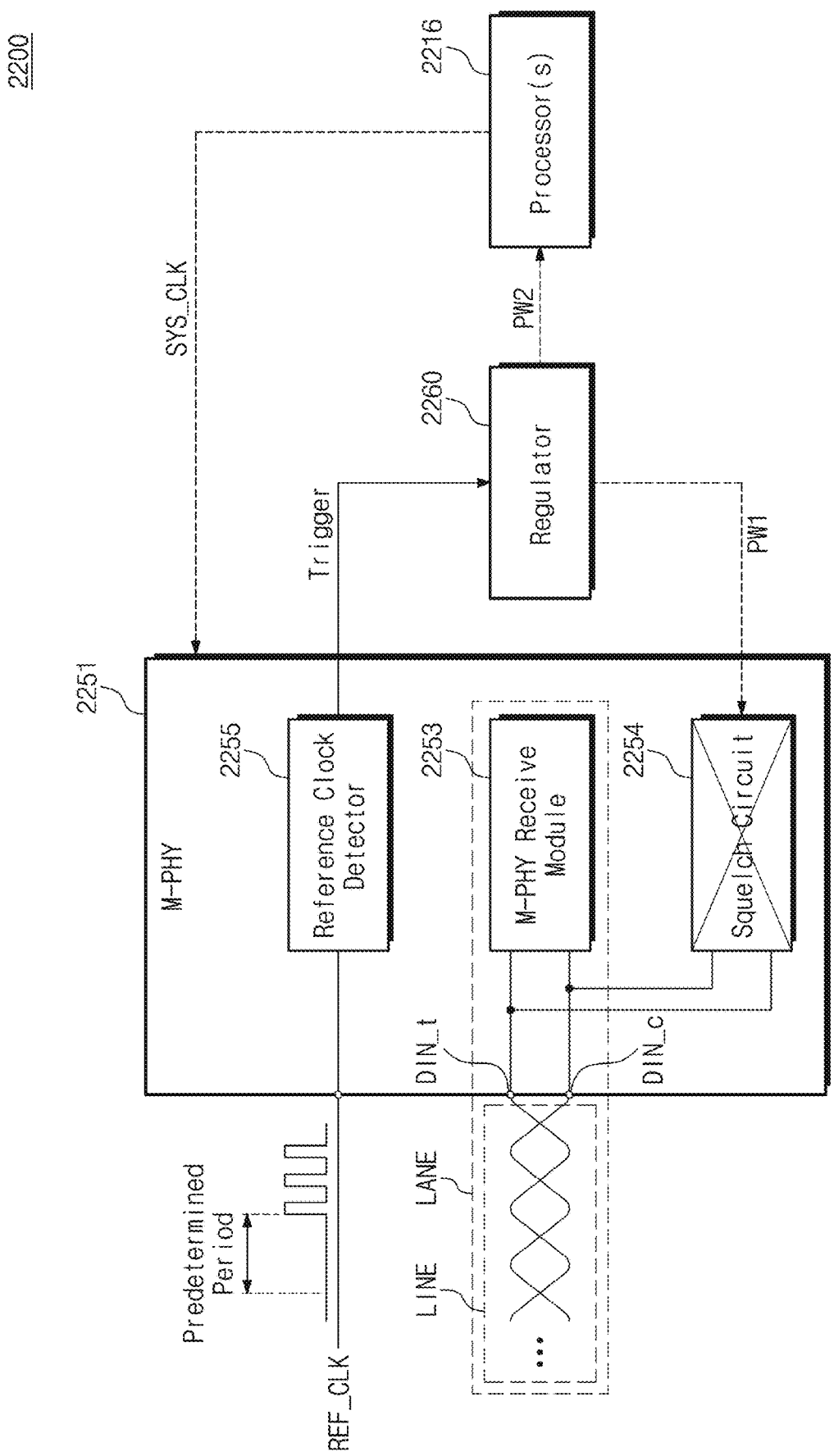
FIGS. 9 and 10 illustrate an example configuration of an UFS device according to an embodiment of the present disclosure.
Figure 10:
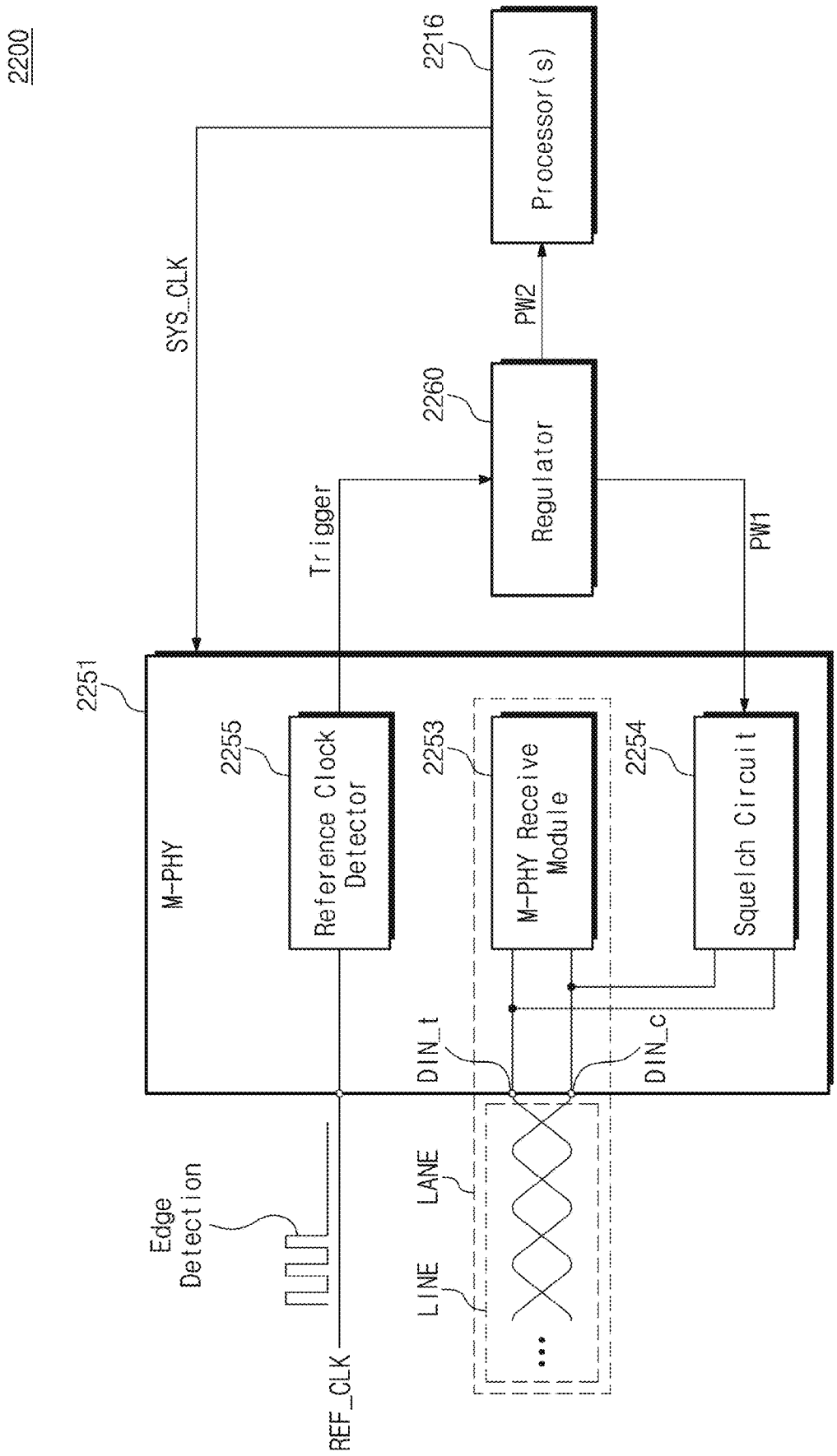

FIGS. 9 and 10 illustrate example configuration of the UFS device 2200 according to an example embodiment of the present disclosure. For example, FIG. 9 conceptually illustrates how an interface circuit enters the idle mode (e.g., the HIBERN8 state) from the active mode, and FIG. 10 conceptually illustrates how the interface circuit enters the active mode from the idle mode (e.g., the HIBERN8 state).

Referring to FIGS. 8 and 9, the UFS device 2200 may include a physical layer 2251, the regulator 2260, and a processor 2216. The physical layer 2251 may include an M-PHY receive module 2253, the squelch circuit 2254, and the reference clock detector 2255. For example, the physical layer 2251 may be included in the UIC layer 2250 of FIGS. 2 to 4, and the processor 2216 may be included in the UFS device controller 2210 of FIG. 2. The M-PHY receive module 2253 may include a circuit (e.g., an analog front end) for processing a signal received from the UFS host 2100 (refer to FIG. 2). The M-PHY receive module 2253 may be connected with a line "LINE" through the input terminals DIN_t and DIN_c. The line "LINE", the input terminals DIN_t and DIN_c, and the M-PHY receive module 2253 may be referred to as a "lane".

In the case where the reference clock REF_CLK is not received during a given time (or a predetermined period), the UIC layer 2150 (refer to FIG. 2) of the UFS host 2100 may have already entered the hibernate state HIBERN8. In this case, the reference clock detector 2255 may generate a trigger signal for allowing the UIC layer 2250 to enter the hibernate state HIBERN8 and may transfer the trigger signal to the regulator 2260.

In response to the trigger signal, the regulator 2260 may control a power supply voltage that is provided to components of the UFS device 2200. For example, the regulator 2260 may block a power supply voltage PW1 being input to the squelch circuit 2254 and may block a power supply voltage PW2 being input to the processor 2216. Accordingly, the processor 2216 (or a separate system clock generator (not illustrated) that is controlled by the processor 2216) may not generate a system clock SYS_CLK for operating the UFS device 2200, and the squelch circuit 2254 may not operate.

Referring to FIG. 10, the squelch circuit 2254 may not operate while the UIC layer 2250 is in the hibernate state HIBERN8. Instead, the reference clock detector 2255 may detect whether the reference clock REF_CLK is received. The reference clock detector 2255 detects an edge of the reference clock REF_CLK and generates a trigger signal for allowing the UFS device 2200 to enter the active mode, based on a result of the detection.

The regulator 2260 may supply the power PW1 to the powered-off components (in particular, the squelch circuit 2254) of the physical layer (M-PHY) 2251 in response to the trigger signal. The regulator 2260 may also supply the power supply voltage PW2 to the processor 2216. The processor 2216 (or a component (not illustrated) to generate a system clock that is controlled by the processor 2216) may generate the system clock SYS_CLK, and the UFS device 2200 may enter the active mode.

Figure 11:
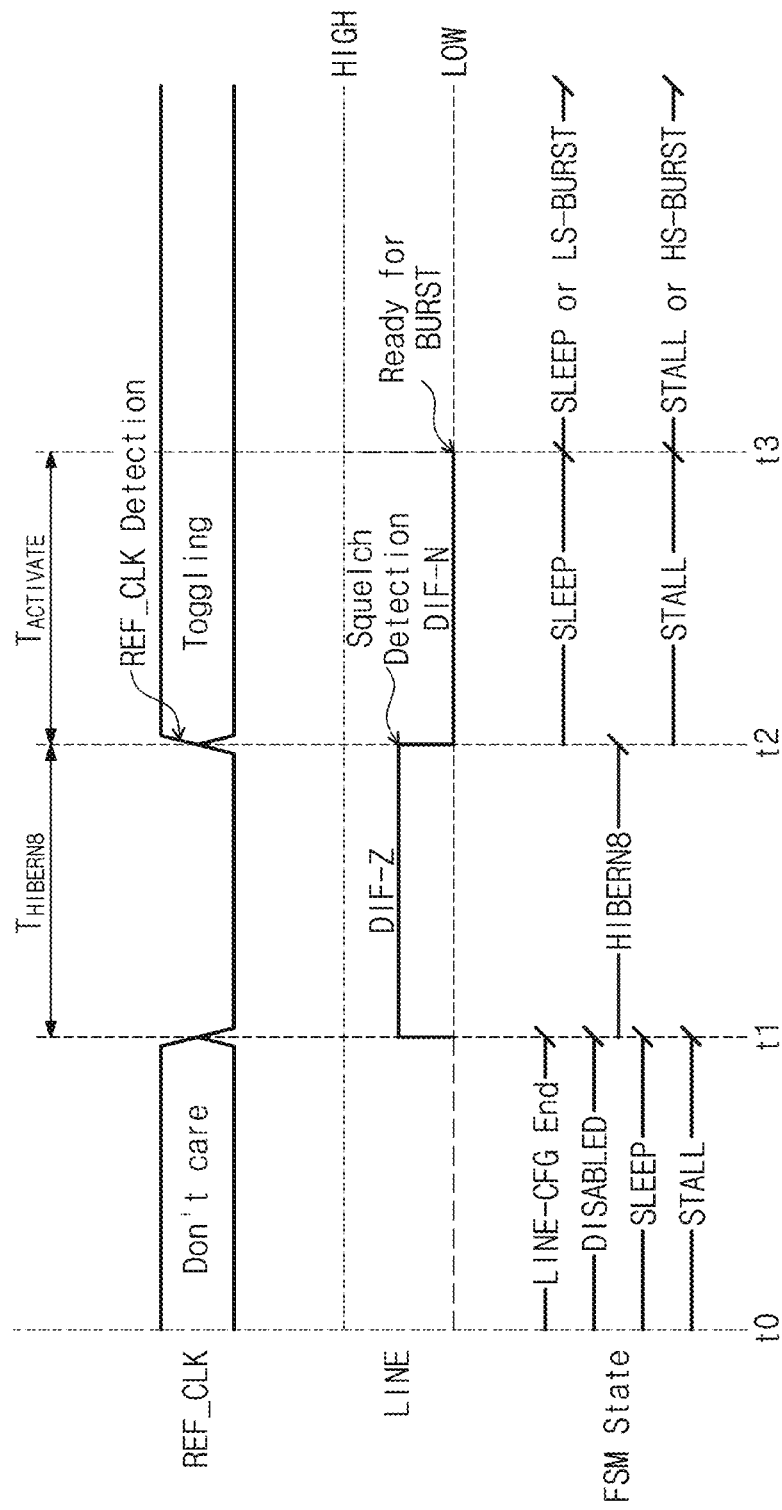
FIG. 11 illustrates waveforms of signals associated with a storage device according to an example embodiment of the present disclosure.

FIG. 11 schematically illustrates waveforms of signals associated with a storage device according to example embodiment of the present disclosure.

Referring to FIGS. 3 and 11, during a hibernate interval $T_{HIBERN8}$, the UIC layer 2150 may not transfer the reference clock REF_CLK to the UIC layer 2250. During the hibernate interval $T_{HIBERN8}$, a state of the line "LINE" connecting the output terminals DOUT_t and DOUT_c of the UIC layer 2150 and the input terminal DIN_t and DIN_c of the UIC layer 2250 may be DIF-Z. In the case where the UIC layer 2250 is out of the hibernate interval $T_{HIBERN8}$, and enters the sleep state SLEEP or the stall state STALL, a state of the line "LINE" may switch to DIF-N.

For example, the hibernate state HIBERN8 of the UIC layer 2250 may correspond to the hibernate interval $T_{HIBERN8}$. In the hibernate interval $T_{HIBERN8}$, the reference clock detector 2255 may detect whether the reference clock REF_CLK is received from the UFS host 2100. At a time t2 when the reference clock REF_CLK is detected, the UIC layer 2250 may enter the active mode (e.g., the sleep or stall state).

Figure 12:
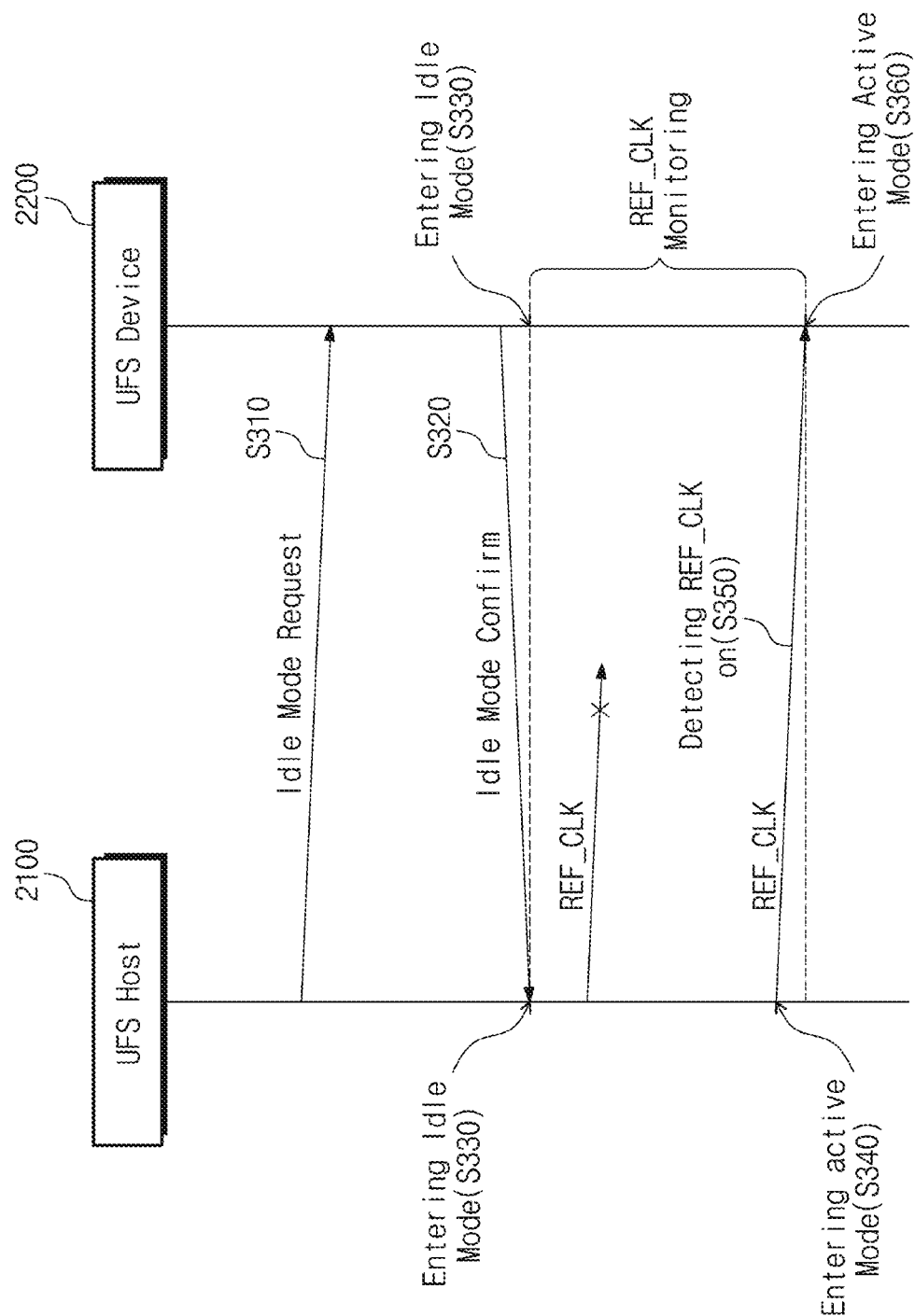
FIG. 12 illustrates an operating method of an UFS system according to an example embodiment of the present disclosure.

FIG. 12 illustrates an operating method of an UFS system according to an embodiment of the present disclosure.

Referring to FIGS. 3 and 12, in the case where the UFS host 2100 does not execute any operation, the UFS host 2100 may request the UFS device 2200 to enter the idle mode (S310). When the UFS device 2200 is ready to enter the idle mode, the UFS device 2200 transfers a confirm signal indicating that it is possible for the system 1000 to enter the idle mode to the UFS host 2100 (S320), and the UFS host 2100 and the UFS device 2200 enter the idle mode (S330). Together with entering the idle mode, a transfer of the reference clock REF_CLK from the UFS host 2100 to the UFS device 2200 is blocked.

After the UFS system 2000 enters the idle mode, the reference clock detector 2255 may monitor whether the reference clock REF_CLK is received from the UFS host 2100. Afterwards, when the UFS host 2100 enters the active mode (S340), the UFS host 2100 may transfer the reference clock REF_CLK to the UFS device 2200, and the reference clock detector 2255 may detect the reference clock REF_CLK (S350). The reference clock detector 2255 may generate a trigger signal for allowing the UFS device 2200 to enter the active mode based on a detection result, and the UFS device 2200 may enter the active mode as the regulator 2260 may resume a power supply to the UFS device 2200 (S360).

Figure 13:
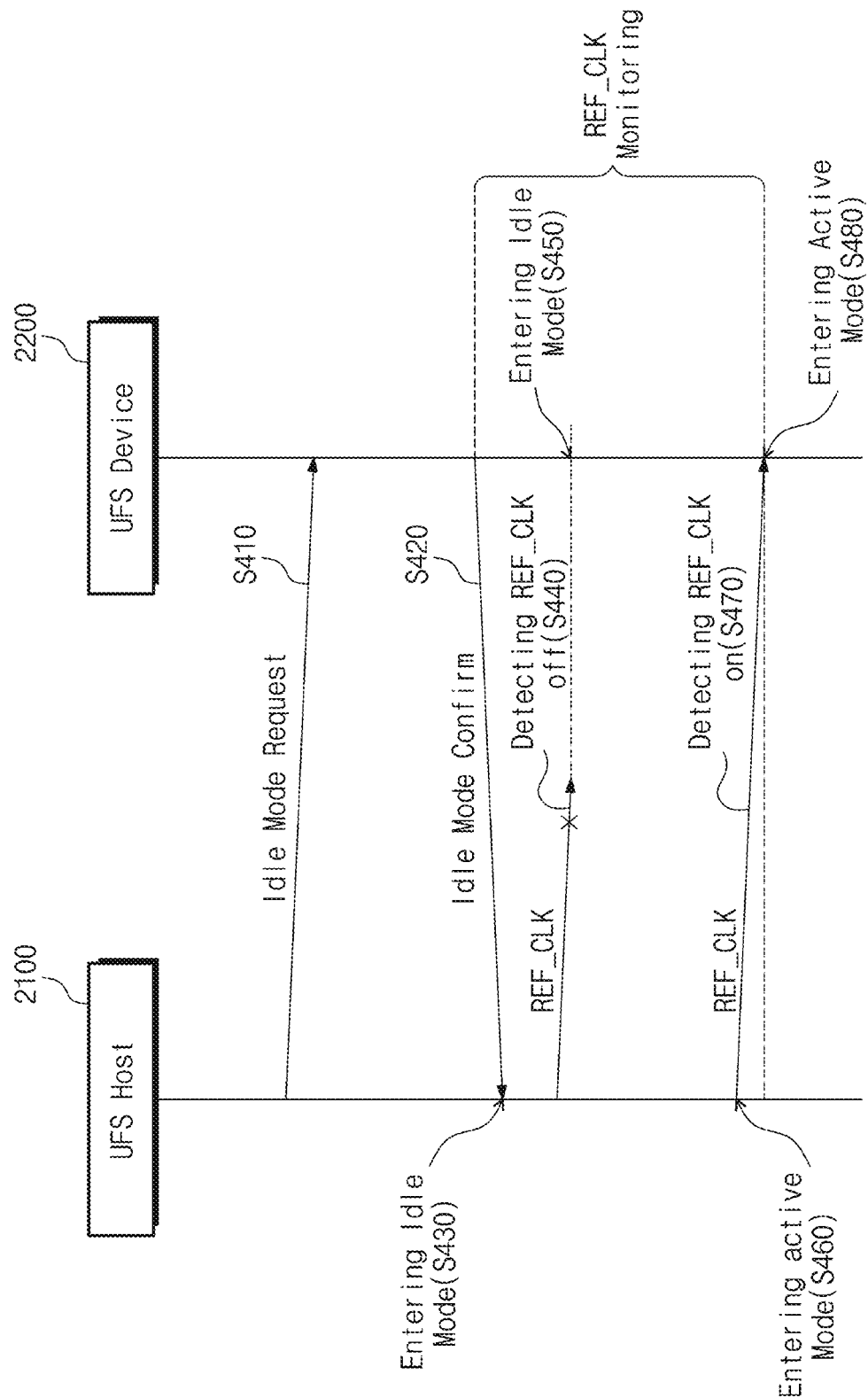
FIG. 13 illustrates an operating method of an UFS system according to an example embodiment of the present disclosure.

FIG. 13 illustrates an operating method of an UFS system according to an embodiment of the present disclosure. The example embodiment of FIG. 11 mostly similar to the embodiment of FIG. 12. However, there may be difference in a manner in which the UFS device 2200 enters the idle mode and a timing when the UFS device 2200 enters the idle mode.

Referring to FIGS. 3 and 13, the UFS host 2100 requests the UFS device 2200 to enter the idle mode (S410), and the UFS device 2200 transfers an idle mode confirm signal to the UFS host 2100 (S420). The UFS host 2100 enters the idle mode in response to the idle mode confirm signal (S430), and a transfer of the reference clock REF_CLK is blocked. As the reference clock detector 2255 of the UFS device 2200 detects an off of the reference clock REF_CLK, the UFS device 2200 enters the idle mode (S450).

Afterwards, when the UFS host 2100 enters the active mode (S460), the UFS host 2100 may transfer the reference clock REF_CLK to the UFS device 2200, and the reference clock detector 2255 may detect the reference clock REF_CLK (S370). The reference clock detector 2255 may generate a trigger signal for allowing the UFS device 2200 to enter the active mode based on a detection result, and the UFS device 2200 may enter the active mode as the regulator 2260 may resume a power supply to the UFS device 2200 (S480).

Figure 14:
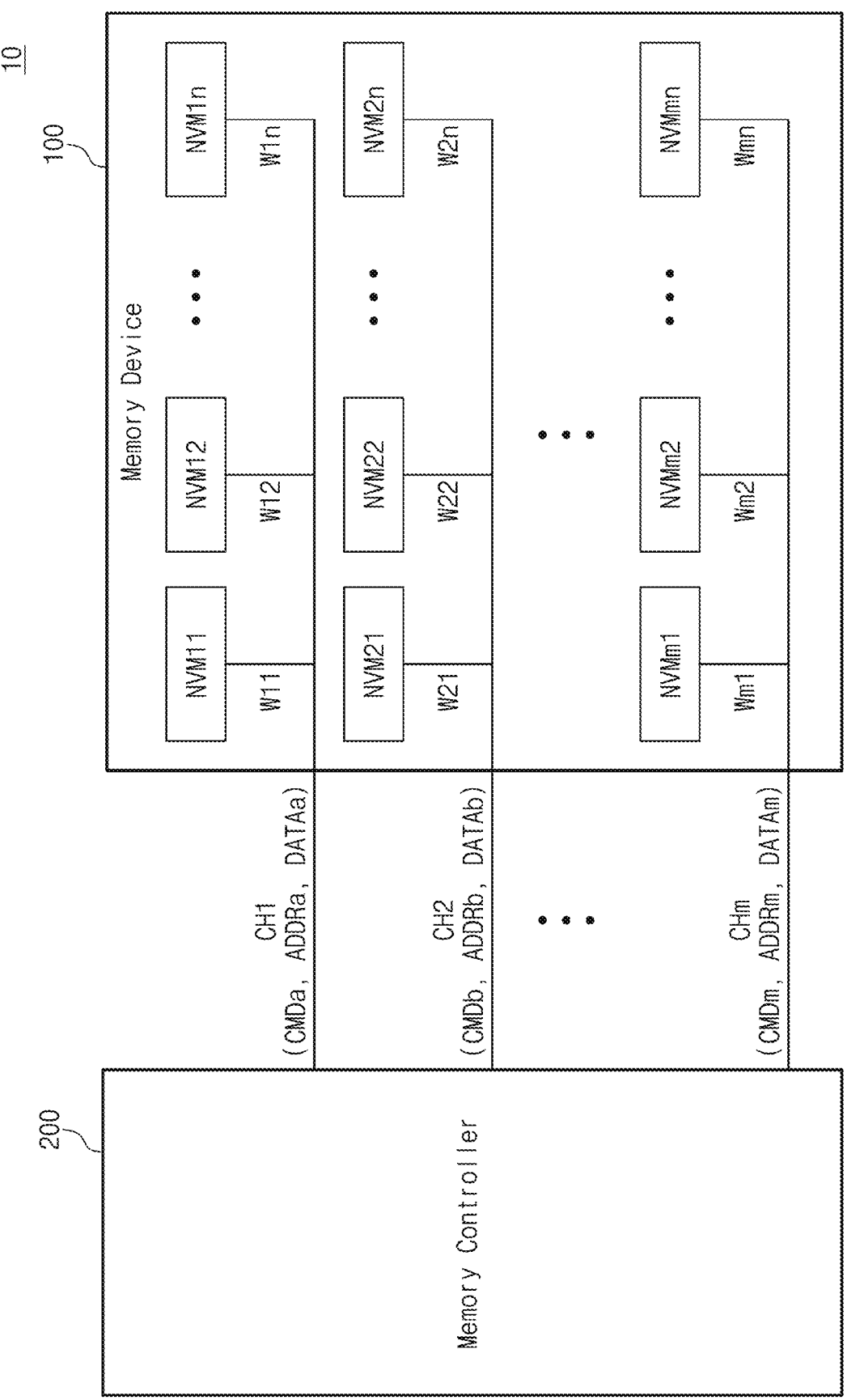
FIG. 14 illustrates a memory system according to an example embodiment of the present disclosure.

FIG. 14 illustrates a memory system according to an embodiment of the present disclosure. Referring to FIG. 14, a memory system 10 may include a memory device 100 and a memory controller 200. The memory system 10 may support a plurality of channels CH1 to CHm, and the memory device 100 and the memory controller 200 may be connected through the plurality of channels CH1 to CHm. For example, the memory system 10 may be implemented with a storage device such as a solid state drive (SSD).

The memory device 100 may include a plurality of non-volatile memory devices NVM11 to NVMmn. Each of the non-volatile memory devices NVM11 to NVMmn may be connected with one of the plurality of channels CH1 to CHm through a relevant way. For example, the non-volatile memory devices NVM11 to NVMin may be connected with the first channel CH1 through ways W11 to W1n, and the non-volatile memory devices NVM21 to NVM2n may be connected with the second channel CH2 through ways W21 to W2n. In an embodiment, each of the non-volatile memory devices NVM11 to NVMmn may be implemented with a memory unit capable of operating depending on an individual command from the memory controller 200. For example, each of the non-volatile memory devices NVM11 to NVMmn may be implemented with a chip or a die, but the present disclosure is not limited thereto.

The memory controller 200 may exchange signals with the memory device 100 through the plurality of channels CH1 to CHm. For example, the memory controller 200 may transfer commands CMDa to CMDm, addresses ADDRa to ADDRm, and data DATAa to DATAm to the memory device 100 through the channels CH1 to CHm or may receive the data DATAa to DATAm from the memory device 100.

Through each channel, the memory controller 200 may select one of non-volatile memory devices connected with each channel and may exchange data with the selected non-volatile memory device. For example, the memory controller 200 may select the non-volatile memory device NVM11 of the non-volatile memory devices NVM11 to NVM1n connected with the first channel CH1. Through the first channel CH1, the memory controller 200 may transfer the command CMDa, the address ADDRa, and the data DATAa to the selected non-volatile memory device NVM11 or may receive the data DATAa from the selected non-volatile memory device NVM11.

The memory controller 200 may exchange signals with the memory device 100 through different channels in parallel. For example, while the memory controller 200 transfers the command CMDa to the memory device 100 through the first channel CH1, the memory controller 200 may transfer the command CMDb to the memory device 100 through the second channel CH2. For example, while the memory controller 200 receives the data DATAa from the memory device 100 through the first channel CH1, the memory controller 200 may receive the data DATAb from the memory device 100 through the second channel CH2.

The memory controller 200 may control overall operations of the memory device 100. The memory controller 200 may transfer signals to the channels CH1 to CHm and may control the non-volatile memory devices NVM11 to NVMmn connected with the channels CH1 to CHm, respectively. For example, the memory controller 200 may transfer the command CMDa and the address ADDRa to the first channel CH1 and may control one selected from the non-volatile memory devices NVM11 to NVMin.

Each of the non-volatile memory devices NVM11 to NVMmn may operate under control of the memory controller 200. For example, the non-volatile memory device NVM11 may receive the command CMDa, the address ADDRa, and the data DATAa provided to the first channel CH1 and may program the data DATAa based on the command CMDa and the address ADDRa. For example, the non-volatile memory device NVM21 may read the data DATAb based on the command CMDb and the address ADDRb provided to the second channel CH2 and may transfer the read data DATAb to the memory controller 200.

An embodiment is illustrated in FIG. 14 as the memory device 100 communicates with the memory controller 200 through "m" channels and the memory device 100 includes "n" non-volatile memory devices for each channel, but the number of channels and the number of non-volatile memory devices connected with one channel may be variously changed.

Figure 15:
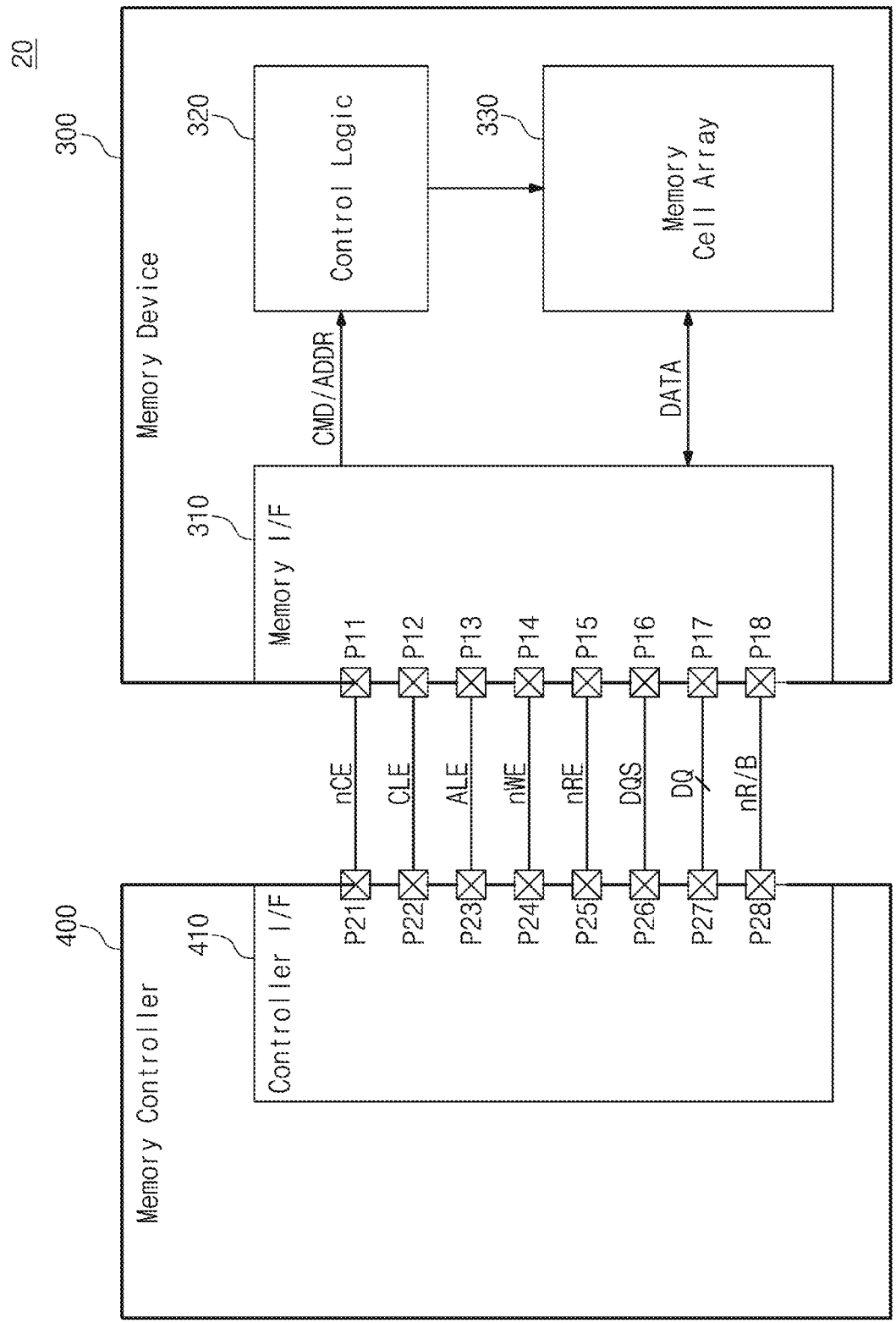
FIG. 15 is a block diagram illustrating a memory system according to an example embodiment of the present disclosure.

FIG. 15 is a block diagram illustrating a memory system according to an embodiment of the present disclosure. Referring to FIG. 15, a memory system 20 may include a memory device 300 and a memory controller 400. The memory device 300 may correspond to one of the non-volatile memory devices NVM11 to NVMmn, which communicates with the memory controller 200 based on one of the plurality of channels CH1 to CHm of FIG. 14. The memory controller 400 may correspond to the memory controller 200 of FIG. 14.

The memory device 300 may include first to eighth pins P11 to P18, a memory interface circuit 310, a control logic circuit 320, and a memory cell array 330.

The memory interface circuit 310 may receive a chip enable signal nCE from the memory controller 400 through the first pin P11. The memory interface circuit 310 may transmit/receive signals to/from the memory controller 400 through the second to eighth pins P12 to P18 depending on the chip enable signal nCE. For example, when the chip enable signal nCE is in an enable state (e.g., at a low level), the memory interface circuit 310 may transmit/receive signals to/from the memory controller 400 through the second to eighth pins P12 to P18.

The memory interface circuit 310 may receive a command latch enable signal CLE, an address latch enable signal ALE, and a write enable signal nWE from the memory controller 400 through the second to fourth pins P12 to P14. Through the seventh pin P17, the memory interface circuit 310 may receive a data signal DQ from the memory controller 400 or may transfer the data signal DQ to the memory controller 400. A command CMD, an address ADDR, and data "DATA" may be transferred through the data signal DQ. For example, the data signal DQ may be transferred through a plurality of data signal lines. In this case, the seventh pin P17 may include a plurality of pins respectively corresponding to a plurality of data signals.

The memory interface circuit 310 may obtain the command CMD from the data signal DQ received in an enable period (e.g., in a high level state) of the command latch enable signal CLE, based on toggle timings of the write enable signal nWE. The memory interface circuit 310 may obtain the address ADDR from the data signal DQ received in an enable period (e.g., in a high level state) of the address latch enable signal ALE, based on toggle timings of the write enable signal nWE.

In an embodiment, the write enable signal nWE may maintain a static state (e.g., a high level or a low level) and may then toggle between the high level and the low level. For example, the write enable signal nWE may toggle in a period where the command CMD or the address ADDR is transferred. As such, the memory interface circuit 310 may obtain the command CMD or the address ADDR based on toggle timings of the write enable signal nWE.

The memory interface circuit 310 may receive a read enable signal nRE from the memory controller 400 through the fifth pin P15. Through the sixth pin P16, the memory interface circuit 310 may receive a data strobe signal DQS from the memory controller 400 or may transfer the data strobe signal DQS to the memory controller 400.

In an operation where the memory device 300 outputs the data "DATA", before outputting the data "DATA", the memory interface circuit 310 may receive the read enable signal nRE toggling through the fifth pin P15. The memory interface circuit 310 may generate the data strobe signal DQS toggling based on a toggling of the read enable signal nRE. For example, the memory interface circuit 310 may generate the data strobe signal DQS that starts to toggle after a given delay (e.g., tDQSRE) from a time when the read enable signal nRE starts to toggle. The memory interface circuit 310 may transfer the data signal DQ including the data "DATA" based on toggle timings of the data strobe signal DQS. As such, the data "DATA" may be aligned with the toggle timings of the data strobe signal DQS and may be transferred to the memory controller 400.

In an operation where the memory device 300 receives the data "DATA", when the data signal DQ including the data "DATA" is received from the memory controller 400, the memory interface circuit 310 may receive the data strobe signal DQS toggling from the memory controller 400, together with the data "DATA". The memory interface circuit 310 may obtain the data "DATA" from the data signal DQ based on toggle timings of the data strobe signal DQS. For example, the memory interface circuit 310 may obtain the data "DATA" by sampling the data signal DQ at a rising edge and a falling edge of the data strobe signal DQS.

The memory interface circuit 310 may transfer a ready/busy signal nR/B to the memory controller 400 through the eighth pin P18. The memory interface circuit 310 may transfer status information of the memory device 300 to the memory controller 400 through the ready/busy signal nR/B. When the memory device 300 is in a busy state (i.e., when internal operations of the memory device 300 are being performed), the memory interface circuit 310 may transfer the ready/busy signal nR/B indicating the busy state to the memory controller 400. When the memory device 300 is in a ready state (i.e., when internal operations of the memory device 300 are not performed or are completed), the memory interface circuit 310 may transfer the ready/busy signal nR/B indicating the ready state to the memory controller 400. For example, while the memory device 300 reads the data "DATA" from the memory cell array 330 in response to a page read command, the memory interface circuit 310 may transfer the ready/busy signal nR/B indicating the busy state (e.g., the low level) to the memory controller 400. For example, while the memory device 300 programs the data "DATA" in the memory cell array 330 in response to a program command, the memory interface circuit 310 may transfer the ready/busy signal nR/B indicating the busy state to the memory controller 400.

The control logic circuit 320 may control various kinds of operations of the memory device 300. The control logic circuit 320 may receive the command/address CMD/ADDR obtained by the memory interface circuit 310. The control logic circuit 320 may generate control signals for controlling the remaining components of the memory device 300 depending on the received command/address CMD/ADDR. For example, the control logic circuit 320 may generate various kinds of control signals for programming the data "DATA" in the memory cell array 330 or reading the data "DATA" from the memory cell array 330.

The memory cell array 330 may store the data "DATA" obtained by the memory interface circuit 310 under control of the control logic circuit 320. Under control of the control logic circuit 320, the memory cell array 330 may output the data "DATA" stored therein to the memory interface circuit 310.

The memory cell array 330 may include a plurality of memory cells. For example, the plurality of memory cells may be flash memory cells. However, the present disclosure is not limited thereto. For example, the memory cells may include resistive random access memory (RRAM) cells, ferroelectric random access memory (FRAM) cells, phase change random access memory (PRAM) cells, thyristor random access memory (TRAM) cells, or magnetic random access memory (MRAM) cells. Below, embodiments of the present disclosure will be described on the basis of an embodiment where memory cells are NAND flash memory cells.

The memory controller 400 may include first to eighth pins P21 to P28, and a controller interface circuit 410. The first to eighth pins P21 to P28 may correspond to the first to eighth pins P11 to P18 of the memory device 300, respectively.

The controller interface circuit 410 may transfer the chip enable signal nCE to the memory device 300 through the first pin P21. The controller interface circuit 410 may transmit/receive signals to/from the memory device 300, which is selected through the chip enable signal nCE, through the second to eighth pins P22 to P28.

The controller interface circuit 410 may transfer the command latch enable signal CLE, the address latch enable signal ALE, and the write enable signal nWE to the memory device 300 through the second to fourth pins P22 to P24. Through the seventh pin P27, the controller interface circuit 410 may transfer the data signal DQ to the memory device 300 or may receive the data signal DQ from the memory device 300.

The controller interface circuit 410 may transfer the data signal DQ including the command CMD or the address ADDR to the memory device 300 together with the write enable signal nWE toggling. The controller interface circuit 410 may transfer the data signal DQ including the command CMD to the memory device 300 by transferring the command latch enable signal CLE having an enable state, and may transfer the data signal DQ including the address ADDR to the memory device 300 by transferring the address latch enable signal ALE having an enable state.

The controller interface circuit 410 may transfer the read enable signal nRE to the memory device 300 through the fifth pin P25. Through the sixth pin P26, the controller interface circuit 410 may receive the data strobe signal DQS from the memory device 300 or may transfer the data strobe signal DQS to the memory device 300.

In an operation where the data "DATA" are output from the memory device 300, the controller interface circuit 410 may generate the read enable signal nRE toggling and may transfer the read enable signal nRE to the memory device 300. For example, the controller interface circuit 410 may generate the read enable signal nRE that changes from a static state (e.g., the high level or the low level) to a toggling state before the data "DATA" are output from the memory device 300. As such, the data strobe signal DQS that toggles based on the read enable signal nRE may be generated in the memory device 300. The controller interface circuit 410 may receive the data signal DQ including the data "DATA" from the memory device 300 together with the data strobe signal DQS toggling. The controller interface circuit 410 may obtain the data "DATA" from the data signal DQ based on toggle timings of the data strobe signal DQS.

In an operation where the data "DATA" are output to the memory device 300, the controller interface circuit 410 may generate the data strobe signal DQS toggling. For example, the controller interface circuit 410 may generate the data strobe signal DQS that changes from a static state (e.g., the high level or the low level) to a toggling state before the data "DATA" are transferred to the memory device 300. The controller interface circuit 410 may transfer the data signal DQ including the data "DATA" to the memory device 300 based on toggle timings of the data strobe signal DQS.

The controller interface circuit 410 may receive the ready/busy signal nR/B from the memory device 300 through the eighth pin P28. The controller interface circuit 410 may determine status information of the memory device 300 based on the ready/busy signal nR/B.

Figure 16:
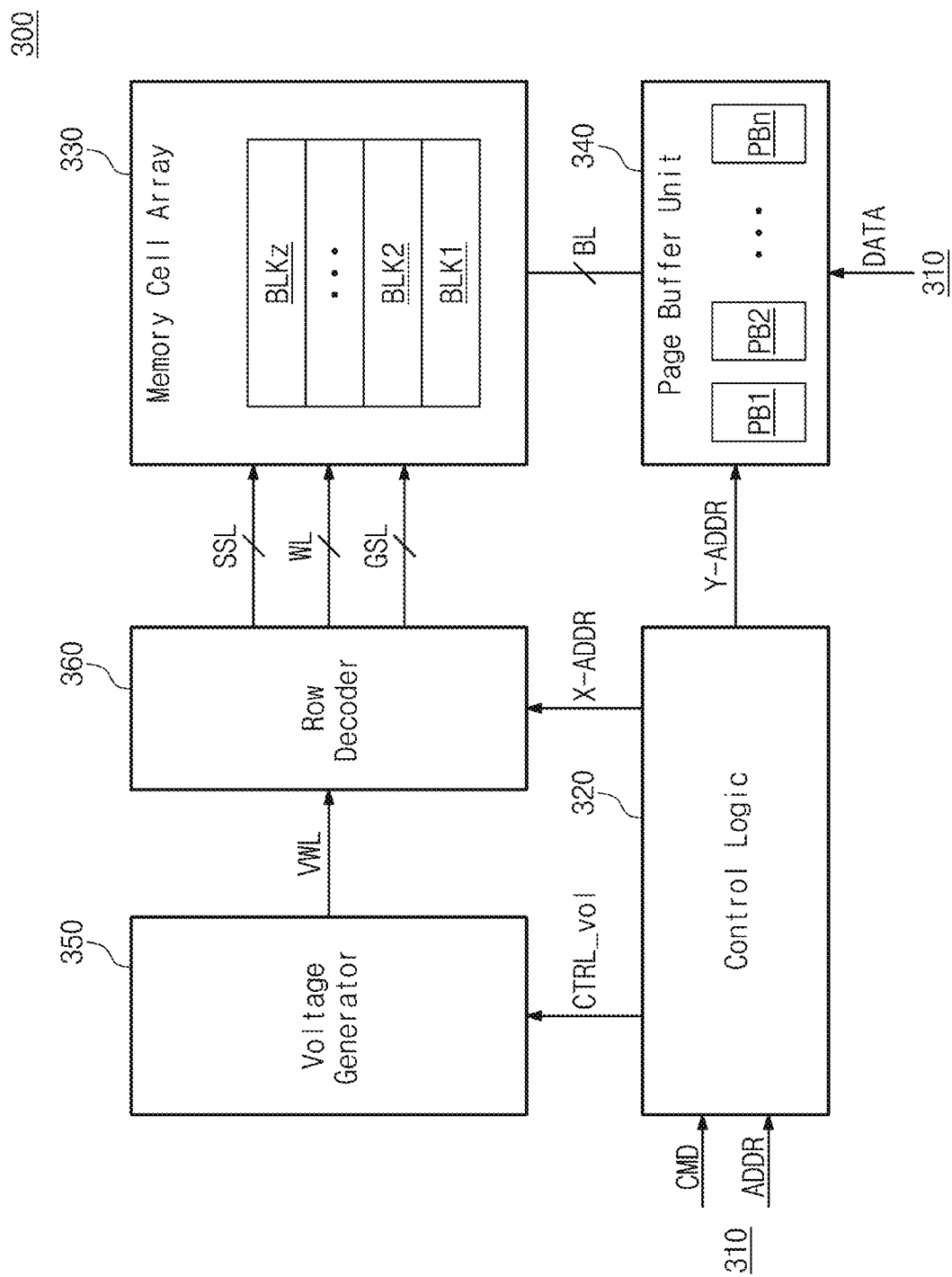
FIG. 16 illustrates an example configuration of a memory device of FIG. 15.

FIG. 16 illustrates a configuration of a memory device of FIG. 15. Referring to FIG. 16, the memory device 300 may include the control logic circuit 320, the memory cell array 330, a page buffer unit 340, a voltage generator 350, and a row decoder 360. Although not illustrated in FIG. 16, the memory device 300 may further include the memory interface circuit 310 illustrated in FIG. 15 and also may further include a column decoder, a pre-decoder, a temperature sensor, a command decoder, an address decoder, and the like.

The control logic circuit 320 may control various kinds of operations of the memory device 300. The control logic circuit 320 may output various control signals in response to the command CMD and/or the address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (z being an integer), and each of the plurality of memory blocks BLK1 to BLKz may include a plurality of memory cells. The memory cell array 330 may be connected with the page buffer unit 340 through bit lines BL and may be connected with the row decoder 360 through word lines WL, string selection lines SSL, and ground selection lines GSL.

In an embodiment, the memory cell array 330 may include a three-dimensional memory cell array, and the three-dimensional memory cell array may include a plurality of NAND strings. Each NAND string may include memory cells connected with word lines vertically stacked above a substrate. The following patent documents are hereby incorporated by reference: U.S. Pat. Nos. 7,679,133; 8,553,466; 8,654,587; 8,559,235; and US Pat. Pub. No. 2011/0233648. In an embodiment, the memory cell array 330 may include a two-dimensional memory cell array, and the two-dimensional memory cell array may include a plurality of NAND strings arranged in a row direction and a column direction.

The page buffer unit 340 may include a plurality of page buffers PB1 to PBn (n being an integer of 3 or more), and the plurality of page buffers PB1 to PBn may be connected with memory cells through the bit lines BL. The page buffer unit 340 may select at least one of the bit lines BL in response to the column address Y-ADDR. The page buffer unit 340 may operate as a write driver or a sense amplifier depending on an operation mode. For example, in a program operation, the page buffer unit 340 may apply a bit line voltage corresponding to data to be programmed to a selected bit line. In a read operation, the page buffer unit 340 may sense data stored in a memory cell by sensing a current or a voltage of the selected bit line.

The voltage generator 350 may generate various kinds of voltages for performing program, read, and erase operations, based on the voltage control signal CTRL_vol. For example, the voltage generator 350 may generate a program voltage, a read voltage, a program verification voltage, an erase voltage, or the like as a word line voltage VWL.

In response to the row address X-ADDR, the row decoder 360 may select one of the word lines WL and may select one of the string selection lines SSL. For example, the row decoder 360 may apply the program voltage/program verification voltage to the selected word line in the program operation and may apply the read voltage to the selected word line in the read operation.

Figure 17:
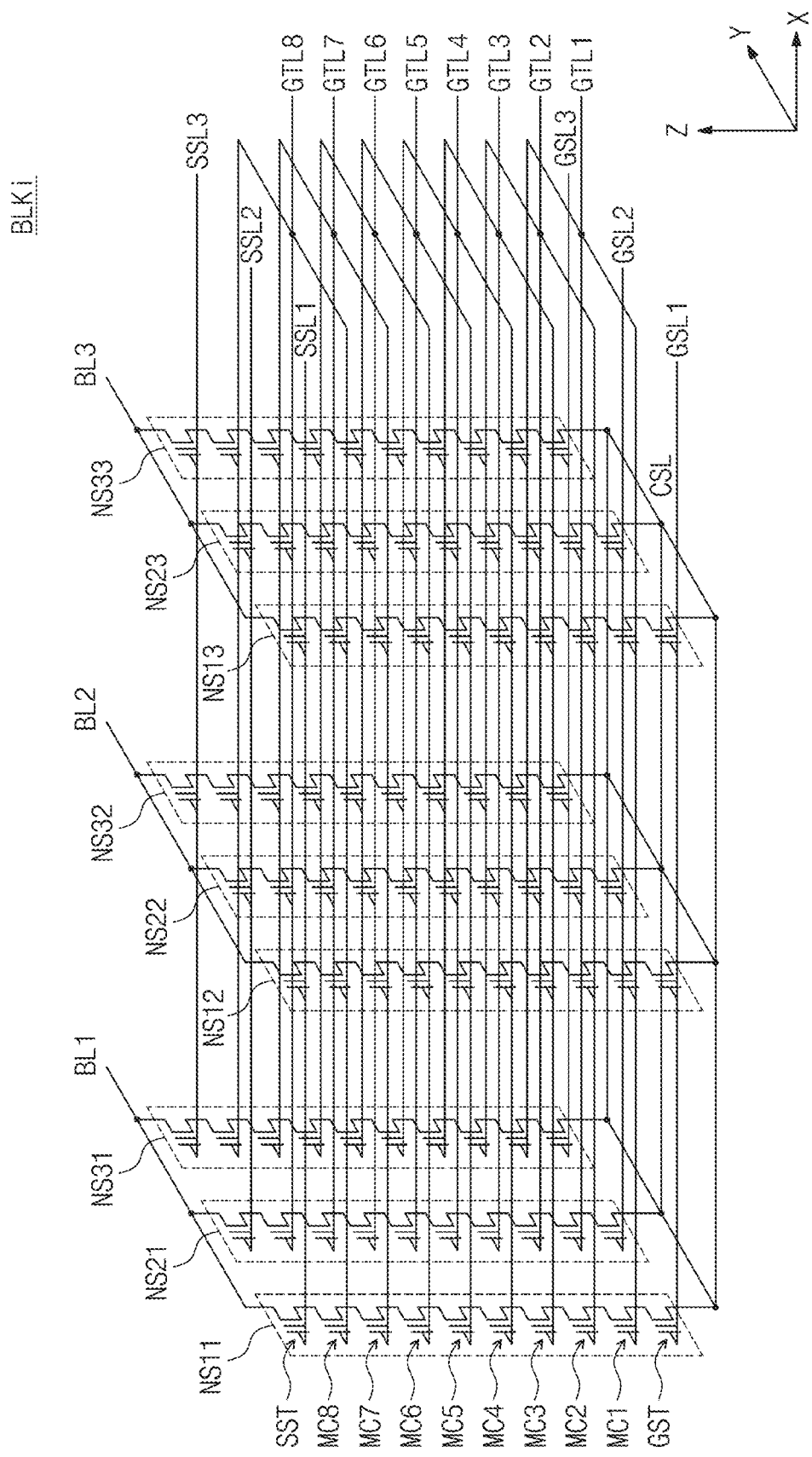
FIG. 17 is a diagram for describing a 3D V-NAND structure applicable to an UFS device according to an example embodiment of the present disclosure.

FIG. 17 is a diagram for describing a 3D V-NAND structure applicable to an UFS device according to an embodiment of the present disclosure. In the case where a storage module of the UFS device is implemented with a 3D V-NAND flash memory, each of a plurality of memory blocks constituting the storage module may be expressed by an equivalent circuit illustrated in FIG. 17.

A memory block BLKi illustrated in FIG. 17 indicates a three-dimensional memory block formed above a substrate in a three-dimensional structure. For example, a plurality of NAND strings included in the memory block BLKi may be formed in a direction perpendicular to the substrate.

Referring to FIG. 17, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1 to MC8, and a ground selection transistor GST. An embodiment is illustrated in FIG. 17 as each of the plurality of memory NAND strings NS11 to NS33 includes 8 memory cells MC1 to MC8, but embodiments are not limited thereto.

The string selection transistors SST of the memory NAND strings NS11 to NS33 may be connected with string selection lines SSL1, SSL2, and SSL3. The memory cells MC1 to MC8 of the plurality of memory NAND strings NS11 to NS33 may be connected with gate lines GTL1 to GTL8. The gate lines GTL1 to GTL8 may correspond to word lines, and a part of the gate lines GTL1 to GTL8 may correspond to a dummy word line(s). The ground selection transistors GST of the plurality of memory NAND strings NS11 to NS33 may be connected with ground selection lines GSL1, GSL2, and GSL3. The string selection transistors SST of the plurality of memory NAND strings NS11 to NS33 may be connected with the bit lines BL1, BL2, and BL3, and the ground selection transistors GST of the plurality of memory NAND strings NS11 to NS33 may be connected with the common source line CSL.

Gate lines (e.g., GTL1) of the same height may be connected in common, the ground selection lines GSL1, GSL2, and GSL3 may be separated from each other, and the string selection lines SSL1, SSL2, and SSL3 may be separated from each other. An embodiment is illustrated in FIG. 17 as the memory block BLKi is connected with 8 gate lines GTL1 to GTL8 and 3 bit lines BL1 to BL3, but embodiments are not limited thereto.

Figure 18:
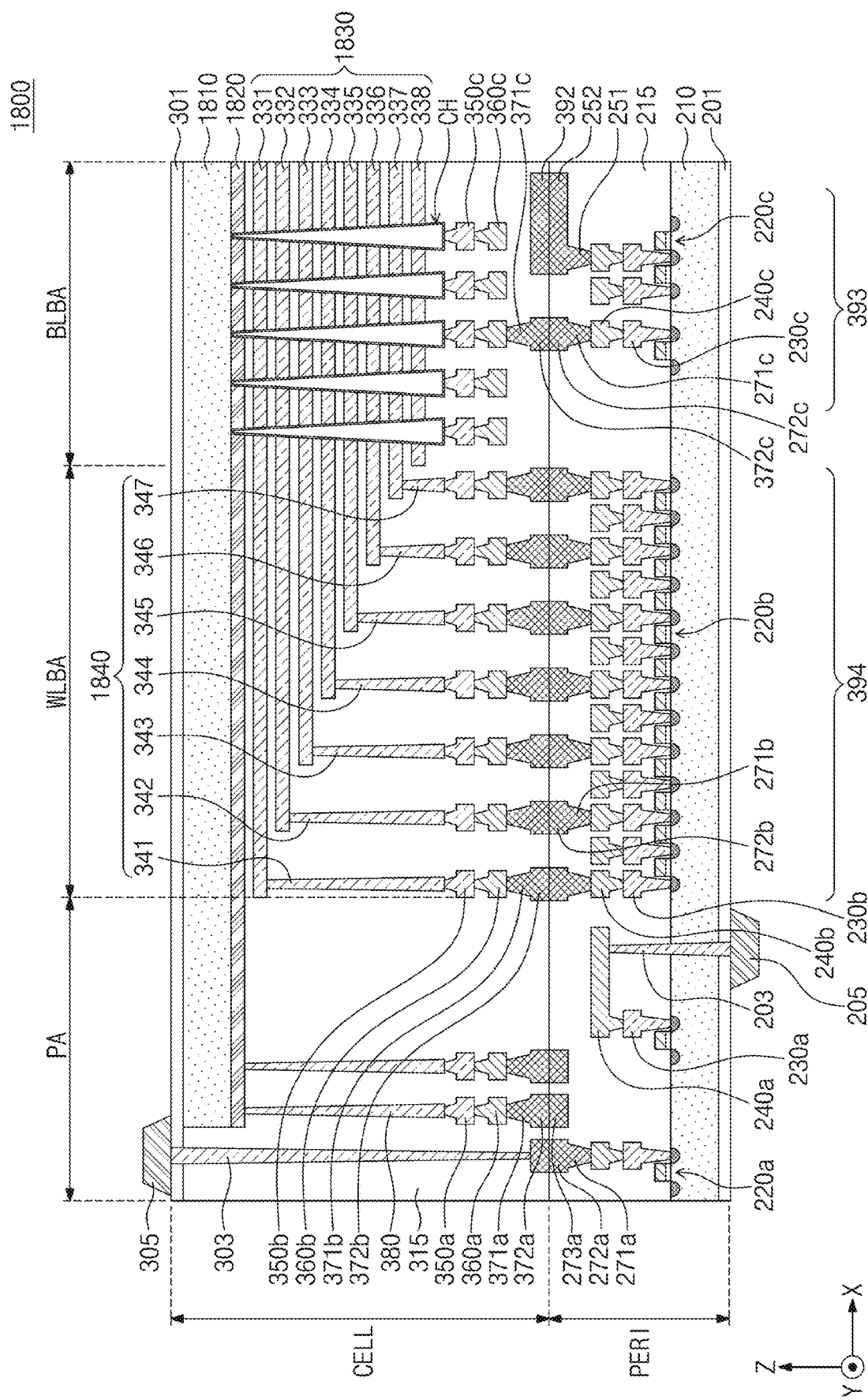
FIG. 18 is a diagram for describing a 3D V-NAND structure applicable to an UFS device according to an example embodiment of the present disclosure.

FIG. 18 is a diagram for describing a 3D V-NAND structure applicable to an UFS device according to an embodiment of the present disclosure. Referring to FIG. 18, a memory device 1800 may have a chip-to-chip (C2C) structure. The C2C structure may refer to a structure formed by manufacturing an upper chip including a cell region CELL on a first wafer, manufacturing a lower chip including a peripheral circuit region PERI on a second wafer different from the first wafer, and then connecting the upper chip and the lower chip in a bonding manner. For example, the bonding manner may include a method of electrically connecting a bonding metal formed in an uppermost metal layer of the upper chip and a bonding metal formed in an uppermost metal layer of the lower chip. For example, when the bonding metals are formed of copper (Cu), the bonding manner may be a Cu—Cu bonding manner, and the bonding metals may also be formed of aluminum or tungsten.

Each of the peripheral circuit region PERI and the cell region CELL of the memory device 1800 may include an external pad bonding area PA, a word line bonding area WLBA, and a bit line bonding area BLBA.

The peripheral circuit region PERI may include a first substrate 210, an interlayer insulating layer 215, a plurality of circuit elements 220a, 220b, and 220c formed on the first substrate 210, first metal layers 230a, 230b, and 230c respectively connected with the plurality of circuit elements 220a, 220b, and 220c, and second metal layers 240a, 240b, and 240c formed on the first metal layers 230a, 230b, and 230c. In an embodiment, the first metal layers 230a, 230b, and 230c may be formed of tungsten having a relatively high resistance, and the second metal layers 240a, 240b, and 240c may be formed of copper having a relatively low resistance.

In the specification, even though the first metal layers 230a, 230b, and 230c and the second metal layers 240a, 240b, and 240c are shown and described, the first metal layers 230a, 230b, and 230c and the second metal layers 240a, 240b, and 240c are not limited thereto, and one or more metal layers may be further formed on the second metal layers 240a, 240b, and 240c. At least a part of the one or more metal layers formed on the second metal layers 240a, 240b, and 240c may be formed of aluminum or the like having a lower resistance than those of copper forming the second metal layers 240a, 240b, and 240c.

The interlayer insulating layer 215 may be disposed on the first substrate 210 to cover the plurality of circuit elements 220a, 220b, and 220c, the first metal layers 230a, 230b, and 230c, and the second metal layers 240a, 240b, and 240c. The interlayer insulating layer 215 may include an insulating material such as silicon oxide, silicon nitride, or the like.

Lower bonding metals 271b and 272b may be formed on the second metal layer 240b in the word line bonding area WLBA. In the word line bonding area WLBA, the lower bonding metals 271b and 272b in the peripheral circuit region PERI may be electrically connected with upper bonding metals 371b and 372b in the cell region CELL in a bonding manner, and the lower bonding metals 271b and 272b and the upper bonding metals 371b and 372b may be formed of aluminum, copper, tungsten, or the like.

The cell region CELL may include at least one memory block. The cell region CELL may include a second substrate 1810 and a common source line 1820. On the second substrate 1810, a plurality of word lines 331 to 338 (i.e., 1830) may be stacked in a direction (i.e., a Z-axis direction) perpendicular to an upper surface of the second substrate 1810. String selection lines and a ground selection line may be arranged on and below the plurality of word lines 1830, respectively, and the plurality of word lines 1830 may be disposed between the string selection lines and the ground selection lines.

In the bit line bonding area BLBA, a channel structure CH may extend in a direction perpendicular to the upper surface of the second substrate 1810 and may pass through the plurality of word lines 1830, the string selection lines, and the ground selection line. The channel structure CH may include a data storage layer, a channel layer, a buried insulating layer, and the like, and the channel layer may be electrically connected with a first metal layer 350c and a second metal layer 360c. For example, the first metal layer 350c may be a bit line contact, and the second metal layer 360c may be a bit line. In an embodiment, the bit line 360c may extend in a first direction (i.e., a Y-axis direction) parallel to the upper surface of the second substrate 1810.

In an embodiment illustrated in FIG. 18, an area in which the channel structure CH, the bit line 360c, and the like are disposed may be defined as the bit line bonding area BLBA. In the bit line bonding area BLBA, the bit line 360c may be electrically connected with the circuit elements 220c constituting a page buffer 393 in the peripheral circuit region PERI. The bit line 360c may be connected with upper bonding metals 371c and 372c in the cell region CELL, and upper bonding metals 371c and 372c may be connected with lower bonding metals 271c and 272c connected with the circuit elements 220c of the page buffer 393.

In the word line bonding area WLBA, the plurality of word lines 1830 may extend in a second direction (i.e., an X-axis direction) parallel to the upper surface of the second substrate 1810 and may be connected with a plurality of cell contact plugs 341 to 347 (i.e., 1840). The word lines 1830 and the cell contact plugs 1840 may be connected with each other at pads provided by at least some of the plurality of word lines 1830, which extend in the second direction with different lengths. A first metal layer 350b and a second metal layer 360b may be sequentially connected with an upper portion of each of the cell contact plugs 1840 connected with the word lines 1830. The cell contact plugs 1840 may be connected with the peripheral circuit region PERI by the upper bonding metals 371b and 372b of the cell region CELL and the lower bonding metals 271b and 272b of the peripheral circuit region PERI in the word line bonding area WLBA.

The cell contact plugs 1840 may be electrically connected with the circuit elements 220b providing a row decoder 394 in the peripheral circuit region PERI. In an embodiment, operating voltages of the circuit elements 220b providing the row decoder 394 may be different than operating voltages of the circuit elements 220c providing the page buffer 393. For example, the operating voltages of the circuit elements 220c providing the page buffer 393 may be greater than the operating voltages of the circuit elements 220b providing the row decoder 394.

A common source line contact plug 380 may be disposed in the external pad bonding area PA. The common source line contact plug 380 may be formed of a conductive material such as a metal, a metal compound, polysilicon, or the like and may be electrically connected with the common source line 1820. A first metal layer 350a and a second metal layer 360a may be sequentially stacked on an upper portion of the common source line contact plug 380. For example, an area in which the common source line contact plug 380, the first metal layer 350a, and the second metal layer 360a are disposed may be defined as the external pad bonding area PA.

Meanwhile, input/output pads 205 and 305 may be disposed in the external pad bonding area PA. Referring to FIG. 18, a lower insulating film 201 covering a lower surface of the first substrate 210 may be formed below the first substrate 210, and the first input/output pad 205 may be formed on the lower insulating film 201. The first input/output pad 205 may be connected with at least one of the plurality of circuit elements 220a, 220b, and 220c disposed in the peripheral circuit region PERI through a first input/output contact plug 203 and may be separated from the first substrate 210 by the lower insulating film 201. In addition, a side insulating film may be disposed between the first input/output contact plug 203 and the first substrate 210 to electrically separate the first input/output contact plug 203 and the first substrate 210.

Referring to FIG. 18, an upper insulating film 301 covering the upper surface of the second substrate 1810 may be formed on the second substrate 1810, and the second input/output pad 305 may be disposed on an upper insulating layer 301. The second input/output pad 305 may be connected with at least one of the plurality of circuit elements 220a, 220b, and 220c disposed in the peripheral circuit region PERI through a second input/output contact plug 303.

According to embodiments, the second substrate 1810 and the common source line 1820 may not be disposed in an area in which the second input/output contact plug 303 is disposed. Also, the second input/output pad 305 may not overlap the word lines 1830 in the third direction (i.e., the Z-axis direction). Referring to FIG. 18, the second input/output contact plug 303 may be separated from the second substrate 1810 in a direction parallel to the upper surface of the second substrate 1810, may pass through an interlayer insulating layer 315 of the cell region CELL, and may be connected with the second input/output pad 305.

According to embodiments, the first input/output pad 205 and the second input/output pad 305 may be selectively formed. For example, the memory device 1800 may only include the first input/output pad 205 disposed on the first substrate 210 or may only include the second input/output pad 305 disposed on the second substrate 1810. Alternatively, the memory device 1800 may include both the first input/output pad 205 and the second input/output pad 305.

In each of the external pad bonding area PA and the bit line bonding area BLBA respectively included in the cell region CELL and the peripheral circuit region PERI, a metal pattern in an uppermost metal layer may be provided as a dummy pattern, or the uppermost metal layer may be absent.

In the external pad bonding area PA, the memory device 1800 may include a lower metal pattern 273a, which corresponds to an upper metal pattern 372a formed in an uppermost metal layer of the cell region CELL and has the same shape as the upper metal pattern 372a of the cell region CELL, in an uppermost metal layer of the peripheral circuit region PERI. In the peripheral circuit region PERI, the lower metal pattern 273a formed in the uppermost metal layer of the peripheral circuit region PERI may not be connected with a contact. As in the above description, in the external pad bonding area PA, an upper metal pattern, which corresponds to the lower metal pattern formed in an uppermost metal layer of the peripheral circuit region PERI and has the same shape as a lower metal pattern of the peripheral circuit region PERI, may be formed in an uppermost metal layer of the cell region CELL.

The lower bonding metals 271b and 272b may be formed on the second metal layer 240b in the word line bonding area WLBA. In the word line bonding area WLBA, the lower bonding metals 271b and 272b of the peripheral circuit region PERI may be electrically connected with the upper bonding metals 371b and 372b of the cell region CELL by a Cu—Cu bonding manner.

Also, the bit line bonding area BLBA, an upper metal pattern 392, which corresponds to a lower metal pattern 252 formed in the uppermost metal layer of the peripheral circuit region PERI and has the same shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

According to the present disclosure, unlike a conventional way to change a power state based on a level change of a packet input to an input terminal, because a power state is changed based on a reference clock, power consumption of a storage device in an idle mode may be further reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
an interface circuit configured to exchange data with a host device, the interface circuit including,
a first input terminal configured to receive a first signal from the host device,
a second input terminal configured to receive a second signal from the host device, the second signal being complementary to the first signal,
a squelch circuit configured to detect levels of the first signal and the second signal,
a reference clock detector configured to detect a receipt of a reference clock from the host device, and to detect whether host device has suspended transmission of the reference clock to the storage device while the storage device is in an active mode,
a phase-locked loop configured to generate a plurality of clocks based on the reference clock; and
a power manager configured to supply a power to the interface circuit such that the power manager selectively supplies the power to the squelch circuit by blocking supply of the power to the squelch circuit of the storage device, without transferring a signal from the storage device to the host device, in response to the reference clock detector detecting that the host device has suspended transmission of the reference clock to the storage device while the storage device is in the active mode, wherein
the squelch circuit and the reference clock detector are implemented in a physical layer (M-PHY) of the interface circuit,
the reference clock detector is implemented outside the squelch circuit, and
the reference clock detector is configured to detect toggling of the reference clock from the host device while the squelch circuit is powered-off.

2. The storage device of claim 1, wherein the reference clock detector is configured to,
generate a first trigger signal, in response to detecting that the host device has suspended transmission of the reference clock to the storage device while the storage device is in the active mode.

3. The storage device of claim 2, wherein the first trigger signal indicates that the interface circuit enters a hibernate state (HIBERN8) from a stall state or a sleep state.

4. The storage device of claim 1, wherein the reference clock detector is configured to,
detect resumption of the receipt of the reference clock while the storage device is in an idle mode, and
generate a second trigger signal, in response to detecting the resumption of the receipt of the reference clock.

5. The storage device of claim 4, wherein the power manager is configured to supply the power to the squelch circuit in response to the second trigger signal.

6. The storage device of claim 4, wherein the second trigger signal indicates that the interface circuit enters a stall state or a sleep state from a hibernate state (HIBERN8).

7. The storage device of claim 1, wherein the interface circuit is implemented with a universal flash storage (UFS) interconnect layer including a physical layer (M-PHY) in which the squelch circuit and the reference clock detector are included.

8. The storage device of claim 1, wherein the interface circuit communicates with the host device in compliance with a universal flash storage (UFS) protocol.

9. A storage system comprising:
a host device including a first interface circuit including a transmit channel configured to transmit a first signal and a second signal, the second signal being complementary to the first signal; and
a storage device including a second interface circuit and a power manager configured to supply a power to the second interface circuit, the second interface circuit including,
a receive channel configured to receive the first signal and the second signal,
a squelch circuit configured to detect levels of the first signal and the second signal,
a reference clock detector configured to detect a receipt of a reference clock from the host device, and to detect whether host device has suspended transmission of the reference clock to the storage device while the storage device is in an active mode, and
a phase-locked loop configured to generate a plurality of clocks based on the reference clock,
wherein the power manager is configured to selectively supply the power to the squelch circuit by blocking supply of the power to the squelch circuit of the storage device, without transferring a signal from the storage device to the host device, in response to the reference clock detector detecting that the host device has suspended transmission of the reference clock to the storage device while the storage device is in the active mode,
wherein an operating mode of the storage device varies between the active mode and an idle mode based on whether the reference clock detector detects the receipt of the reference clock from the host device,
wherein the squelch circuit and the reference clock detector are implemented in a physical layer (M-PHY) of the second interface circuit,
wherein the reference clock detector is implemented outside the squelch circuit, and
wherein the reference clock detector is configured to detect toggling of the reference clock from the host device while the squelch circuit is powered-off.

10. The storage system of claim 9, wherein interruption of the receipt of the reference clock while the storage device is in the active mode indicates that the second interface circuit enters a hibernate state (HIBERN8) from a stall state or a sleep state.

11. The storage system of claim 9, wherein
the reference clock detector is configured to detect resumption of the receipt of the reference clock, while the storage device is in the idle mode, and
the power manager is configured to supply the power to the squelch circuit in response to the reference clock detector detecting the resumption of the receipt of the reference clock.

12. The storage system of claim 11, wherein the resumption of the receipt of the reference clock while the storage device is in the idle mode indicates that the second interface circuit enters a stall state or a sleep state from a hibernate state (HIBERN8).

13. The storage system of claim 9, wherein each of the first interface circuit and the second interface circuit is implemented with a universal flash storage (UFS) interconnect layer including a physical layer (M-PHY).

14. A method of operating a storage device, the storage device including an interface circuit having a receive channel configured to receive a first signal and a second signal from a host device, and a squelch circuit configured to detect levels of the first signal and the second signal, the second signal being complementary to the first signal, the method comprising:
- detecting, by a reference clock detector, a receipt of a reference clock from the host device;
- detecting, by the reference clock detector, whether host device has suspended transmission of the reference clock to the storage device while the storage device is in an active mode;
- generate, by a phase-locked loop, a plurality of clocks based on the reference clock; and
- selectively supplying, by a power manager, a power to the squelch circuit by blocking supply of the power to the squelch circuit of the storage device, without transferring a signal from the storage device to the host device, in response to the reference clock detector detecting that the host device has suspended transmission of the reference clock to the storage device while the storage device is in the active mode, wherein
  - the squelch circuit and the reference clock detector are implemented in a physical layer (M-PHY) of the interface circuit,
  - the reference clock detector is implemented outside the squelch circuit, and
  - the reference clock detector is configured to detect toggling of the reference clock from the host device while the squelch circuit is powered-off.

15. The method of claim 14, wherein the selectively supplying the power comprises:
- resuming a power supply to the squelch circuit, in response to the detecting a resumption of the receipt of the reference clock.

16. The method of claim 14, wherein the interface circuit is implemented with a universal flash storage (UFS) interconnect layer including a physical layer (M-PHY) in which the receive channel and the squelch circuit are included.

* * * * *